US012046199B2

(12) United States Patent
Cho et al.

(10) Patent No.: US 12,046,199 B2
(45) Date of Patent: Jul. 23, 2024

(54) PIXEL AND DISPLAY DEVICE INCLUDING THE SAME

(71) Applicant: Samsung Display Co., LTD., Yongin-si (KR)

(72) Inventors: Dae Youn Cho, Yongin-si (KR); Jong Woo Park, Yongin-si (KR); Sang Kil Kim, Yongin-si (KR); Ji Ho Moon, Yongin-si (KR); Young Tae Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/066,981

(22) Filed: Dec. 15, 2022

(65) Prior Publication Data

US 2023/0335056 A1 Oct. 19, 2023

(30) Foreign Application Priority Data

Apr. 18, 2022 (KR) ........................ 10-2022-0047747

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0202* (2013.01); *G09G 2310/08* (2013.01); *G09G 2320/0233* (2013.01);
(Continued)

(58) Field of Classification Search
CPC ..... G09G 3/32–3291; G09G 2300/0809–0871
See application file for complete search history.

(56) References Cited

U.S. PATENT DOCUMENTS

| | | | |
|---|---|---|---|
| 8,817,008 B2 | 8/2014 | Park et al. | |
| 10,311,782 B2 * | 6/2019 | Rieutort-Louis | G09G 3/3233 |

(Continued)

FOREIGN PATENT DOCUMENTS

| | | |
|---|---|---|
| KR | 10-2010-0053233 A | 5/2010 |
| KR | 10-2218315 B1 | 2/2021 |
| KR | 10-2021-0137328 A | 11/2021 |

OTHER PUBLICATIONS

US Office Action dated Mar. 6, 2024, issued in U.S. Appl. No. 18/301,726 (28 pages).

*Primary Examiner* — Patrick F Marinelli
(74) *Attorney, Agent, or Firm* — Lewis Roca Rothgerber Christie LLP

(57) ABSTRACT

A pixel including: a light emitting element; a first transistor connected between a first node and a second node, and to generate a driving current to flow from a first power line to a second power line through the light emitting element; a second transistor connected between a data line and the first node; a third transistor connected between the second node and a third node corresponding to a gate electrode of the first transistor; a fourth transistor connected between the third node and a third power line; a fifth transistor connected between the first power line and the first node; a sixth transistor connected between the second node and a fourth node corresponding to a first electrode of the light emitting element; a seventh transistor connected between the fourth node and a fourth power line; and an eighth transistor connected between the fourth node and a fifth power line.

16 Claims, 10 Drawing Sheets

(52) U.S. Cl.
CPC . *G09G 2320/043* (2013.01); *G09G 2320/045* (2013.01); *G09G 2330/028* (2013.01)

(56) References Cited

U.S. PATENT DOCUMENTS

| | | | | |
|---|---|---|---|---|
| 10,319,306 | B2 | 6/2019 | Jeong et al. | |
| 10,431,154 | B2 * | 10/2019 | Tsai | G09G 3/3266 |
| 10,546,529 | B2 * | 1/2020 | Kimura | G09G 3/3233 |
| 10,629,130 | B2 | 4/2020 | Kim et al. | |
| 10,665,175 | B2 * | 5/2020 | Kim | G09G 3/3283 |
| 10,916,198 | B2 * | 2/2021 | Lin | G09G 3/3233 |
| 11,017,719 | B2 | 5/2021 | Kim et al. | |
| 11,056,043 | B2 | 7/2021 | Oh et al. | |
| 11,056,049 | B2 * | 7/2021 | Kim | G09G 3/3233 |
| 11,056,060 | B2 | 7/2021 | Kim et al. | |
| 11,176,882 | B2 * | 11/2021 | Umezawa | G09G 3/3233 |
| 11,176,883 | B2 * | 11/2021 | Na | G09G 3/3266 |
| 11,195,459 | B2 * | 12/2021 | Kobayashi | G09G 3/3233 |
| 11,238,786 | B2 | 2/2022 | Byun et al. | |
| 11,282,462 | B2 * | 3/2022 | Lin | H10K 59/1213 |
| 11,341,878 | B2 * | 5/2022 | Kim | G09G 3/3233 |
| 11,348,512 | B2 * | 5/2022 | Kim | G09G 3/3225 |
| 11,367,389 | B2 * | 6/2022 | Xu | G09G 3/3233 |
| 11,423,834 | B2 * | 8/2022 | Park | G09G 3/2096 |
| 11,450,280 | B2 * | 9/2022 | Kim | G09G 3/3233 |
| 11,508,309 | B2 * | 11/2022 | Lin | G09G 3/3266 |
| 11,508,320 | B2 * | 11/2022 | Kim | G09G 3/3266 |
| 11,651,736 | B2 * | 5/2023 | Lin | G09G 3/3233 345/691 |
| 11,682,344 | B2 * | 6/2023 | Kim | G09G 3/3233 345/71 |
| 11,710,432 | B2 * | 7/2023 | Kim | G09G 3/006 345/212 |
| 11,869,412 | B2 * | 1/2024 | In | G09G 3/3233 |
| 2018/0261163 | A1 | 9/2018 | Hyun et al. | |
| 2019/0164485 | A1 | 5/2019 | Tomitani | |
| 2020/0074931 | A1 | 3/2020 | Yang et al. | |
| 2020/0168147 | A1 * | 5/2020 | Na | H01L 27/1222 |
| 2020/0226978 | A1 * | 7/2020 | Lin | G09G 3/3233 |
| 2021/0005138 | A1 * | 1/2021 | Umezawa | G09G 3/3233 |
| 2021/0020109 | A1 * | 1/2021 | Lin | G09G 3/3233 |
| 2021/0027696 | A1 * | 1/2021 | Kim | G09G 3/32 |
| 2021/0125557 | A1 * | 4/2021 | Na | G09G 3/3233 |
| 2021/0367122 | A1 * | 11/2021 | Park | H01L 33/62 |
| 2022/0180812 | A1 * | 6/2022 | Lin | G09G 3/3233 |
| 2022/0199016 | A1 * | 6/2022 | Kim | G09G 3/3233 |
| 2022/0208088 | A1 * | 6/2022 | Kim | H10K 59/124 |
| 2022/0383813 | A1 * | 12/2022 | Wang | G09G 3/3233 |
| 2023/0115779 | A1 * | 4/2023 | Kim | G09G 3/32 345/55 |
| 2023/0142259 | A1 * | 5/2023 | Liu | G09G 3/3233 345/206 |
| 2023/0206858 | A1 * | 6/2023 | Kim | G09G 3/3275 345/204 |
| 2023/0217710 | A1 * | 7/2023 | Jinta | H10K 50/00 257/40 |
| 2023/0225160 | A1 * | 7/2023 | Cho | H10K 59/131 345/694 |
| 2023/0230543 | A1 * | 7/2023 | Kim | G09G 3/3266 345/691 |
| 2023/0237965 | A1 * | 7/2023 | Lin | G09G 3/3258 345/691 |
| 2023/0245619 | A1 * | 8/2023 | Yoon | G09G 3/3208 345/691 |

* cited by examiner

PIXEL AND DISPLAY DEVICE INCLUDING THE SAME

CROSS-REFERENCE TO RELATED APPLICATION

This application claims priority to and the benefit of Korean Patent Application No. 10-2022-0047747, filed on Apr. 18, 2022, the entire content of which is incorporated by reference herein.

BACKGROUND

1. Field

Aspects of one or more embodiments of the present disclosure relate to a pixel, and a display device including the same.

2. Description of the Related Art

A display device includes a plurality of pixels. Each of the pixels includes a plurality of transistors, a capacitor electrically connected to the transistors, and a light emitting element electrically connected to the transistors. The transistors generate a driving current based on signals provided through signal lines, and the light emitting element emits light based on the driving current.

When the light emitting element included in each of the pixels are driven for a long time, the light emitting element may be deteriorated due to an increase in current stress. In this case, luminance uniformity may be reduced due to a deterioration variation of the light emitting elements between the pixels.

The above information disclosed in this Background section is for enhancement of understanding of the background of the present disclosure, and therefore, it may contain information that does not constitute prior art.

SUMMARY

One or more embodiments of the present disclosure are directed to a pixel capable of improving (e.g., removing) a luminance non-uniformity phenomenon according to a deterioration deviation of a light emitting element, and a display device including the same.

According to one or more embodiments of the present disclosure, a pixel includes: a light emitting element; a first transistor connected between a first node and a second node, and configured to generate a driving current to flow from a first power line to a second power line through the light emitting element, the first power line being configured to provide a first power voltage, and the second power line being configured to provide a second power voltage; a second transistor connected between a data line and the first node, and configured to be turned on in response to a fourth scan signal supplied to a fourth scan line; a third transistor connected between the second node and a third node corresponding to a gate electrode of the first transistor, and configured to be turned on in response to a third scan signal supplied to a third scan line; a fourth transistor connected between the third node and a third power line, and configured to be turned on in response to a second scan signal supplied to a second scan line, the third power line being configured to provide a third power voltage; a fifth transistor connected between the first power line and the first node, and configured to be turned off in response to an emission control signal supplied to an emission control line; a sixth transistor connected between the second node and a fourth node corresponding to a first electrode of the light emitting element, and configured to be turned off in response to the emission control signal; a seventh transistor connected between the fourth node and a fourth power line, and configured to be turned on in response to a first scan signal supplied to a first scan line, the fourth power line being configured to provide a fourth power voltage; and an eighth transistor connected between the fourth node and a fifth power line, and configured to be turned on in response to a fifth scan signal supplied to a fifth scan line, the fifth power line being configured to provide a fifth power voltage.

In an embodiment, the fifth power voltage may be greater than the fourth power voltage.

In an embodiment, a voltage level of the fifth power voltage may be less than a value obtained by adding a threshold voltage of the light emitting element with the second power voltage.

In an embodiment, the fourth scan line and the fifth scan line may be the same scan line.

In an embodiment, the pixel may further include: a ninth transistor connected between the first node and a sixth power line, and configured to be turned on in response to the first scan signal, the sixth power line being configured to provide a sixth power voltage.

In an embodiment, one frame period may include: a first driving period in which the fourth scan signal may be supplied to the second transistor, a data signal supplied to the data line may be written, and the first scan signal may be supplied to the ninth transistor; and a second driving period in which the fourth scan signal may not be supplied to the second transistor, and the first scan signal may be supplied to the ninth transistor.

In an embodiment, the first driving period may include: a first period in which the third scan signal may be supplied to the third transistor, and the first scan signal may be supplied to the seventh transistor and the ninth transistor; a second period in which the second scan signal may be supplied to the fourth transistor after the first period; a third period in which the third scan signal may be supplied to the third transistor, and the fourth scan signal may be supplied to the second transistor after the second period; and a fourth period in which the fifth scan signal may be supplied to the eighth transistor after the third period.

In an embodiment, a width of the third scan signal may be greater than a width of the first scan signal during the first period.

In an embodiment, a width of the third scan signal may be greater than a width of the fourth scan signal during the third period.

In an embodiment, the second driving period may include a fifth period in which the first scan signal may be supplied to the seventh transistor and the ninth transistor.

In an embodiment, the second driving period may further include a sixth period in which the fifth scan signal may be supplied to the eighth transistor after the fifth period.

According to one or more embodiments of the present disclosure, a display device includes: a pixel connected to a first scan line, a second scan line, a third scan line, a fourth scan line, a fifth scan line, an emission control line, a data line, a first power line, a second power line, a third power line, a fourth power line, a fifth power line, and a sixth power line; a scan driver configured to supply a first scan signal to the first scan line, a second scan signal to the second scan line, a third scan signal to the third scan line, a fourth scan signal to the fourth scan line, and a fifth scan signal to the fifth scan line; an emission driver configured to supply an emission control signal to the emission control line; a data driver configured to supply a data signal to the data line; and a power supply configured to supply a first power voltage to the first power line, a second power voltage to the second power line, a third power voltage to the third power line, a fourth power voltage to the fourth power line, a fifth power voltage to the fifth power line, and a sixth power voltage to the sixth power line. The pixel includes: a light emitting element; a first transistor connected between a first node and a second node, and configured to generate a driving current to flow from the first power line to the second power line through the light emitting element; a second transistor connected between the data line and the first node, and configured to be turned on in response to the fourth scan signal; a third transistor connected between the second node and a third node corresponding to a gate electrode of the first transistor, and configured to be turned on in response to the third scan signal; a fourth transistor connected between the third node and the third power line, and configured to be turned on in response to the second scan signal; a fifth transistor connected between the first power line and the first node, and configured to be turned off in response to the emission control signal; a sixth transistor connected between the second node and a fourth node corresponding to a first electrode of the light emitting element, and configured to be turned off in response to the emission control signal; a seventh transistor connected between the fourth node and the fourth power line, and configured to be turned on in response to the first scan signal; and an eighth transistor connected between the fourth node and the fifth power line, and configured to be turned on in response to the fifth scan signal.

In an embodiment, the fifth power voltage may be greater than the fourth power voltage.

In an embodiment, the fourth scan line and the fifth scan line may be the same scan line.

In an embodiment, the display device may further include a ninth transistor connected between the first node and the sixth power line, and configured to be turned on in response to the first scan signal.

In an embodiment, one frame period may include a first driving period and a second driving period; in the first driving period, the scan driver may be configured to supply the first scan signal through the first scan line, and the fourth scan signal through the fourth scan line; and in the second driving period, the scan driver may be configured to supply the first scan signal through the first scan line, and not supply the fourth scan signal.

In an embodiment, the first driving period may include: a first period in which the scan driver may be configured to supply the first scan signal to the first scan line, and the third scan signal to the third scan line; a second period in which the scan driver may be configured to supply the second scan signal to the second scan line after the first period; a third period in which the scan driver may be configured to supply the third scan signal to the third scan line, and the fourth scan signal to the fourth scan line after the second period; and a fourth period in which the scan driver may be configured to supply the fifth scan signal to the fifth scan line after the third period.

In an embodiment, a width of the third scan signal may be greater than a width of the first scan signal during the first period, and a width of the third scan signal may be greater than a width of the fourth scan signal during the third period.

In an embodiment, the second driving period may include a fifth period in which the scan driver may be configured to supply the first scan signal to the first scan line.

In an embodiment, the second driving period may further include a sixth period in which the scan driver may be configured to supply the fifth scan signal to the fifth scan line after the fifth period.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
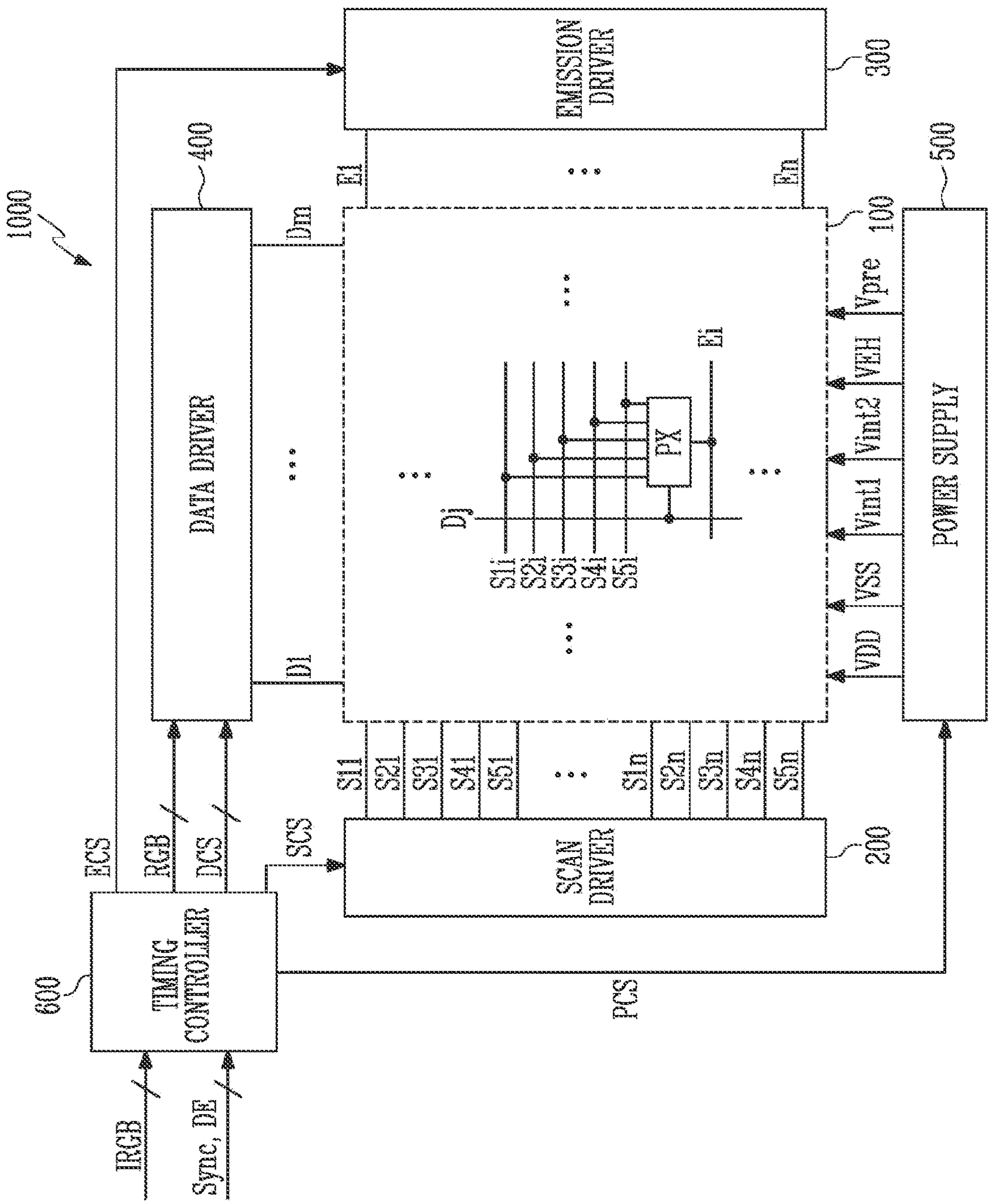
FIG. 1 is a block diagram illustrating a display device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to one or more embodiments of the present disclosure.

Referring to FIG. 1, the display device 1000 may include a pixel unit 100 (e.g., a display panel), a scan driver 200, an emission driver 300, a data driver 400, a power supply 500, and a timing controller 600.

The display device 1000 may display an image at various frame frequencies (e.g., refresh rates, driving frequencies, or screen reproduction rates) according to a driving condition. The frame frequency is a frequency at which a data voltage is written or substantially written to a driving transistor of a pixel PX during one second. For example, the frame frequency is also referred to as a screen scan rate or a screen reproduction frequency, and indicates a frequency at which a display screen is reproduced during one second.

In an embodiment, an output frequency of a data signal of the data driver 400 and/or an output frequency of a scan signal (for example, a fourth scan signal) supplied to a scan line (for example, a fourth scan line) to supply the data signal may be changed in response to the frame frequency. For example, a frame frequency for driving a moving image may be a frequency of about 60 Hz or higher (for example, 60 Hz, 120 Hz, 240 Hz, 360 Hz, 480 Hz, and the like). For example, when the frame frequency is 60 Hz, the fourth scan signal may be supplied to each horizontal line (e.g., pixel row) 60 times during one second.

In an embodiment, the display device 1000 may adjust output frequencies of the scan driver 200 and the emission driver 300, and the output frequency of the data driver 400 corresponding to the output frequencies of the scan driver 200 and the emission driver 300, according to a driving condition. For example, the display device 1000 may display an image in response to various frame frequencies of 1 Hz to 120 Hz. However, this is provided as an example, and the display device 1000 may also display an image at a frame frequency of 120 Hz or higher (for example, 240 Hz or 480 Hz).

The display device 1000 may operate at various frame frequencies. In a case of low-frequency driving, an image defect, such as flicker, may be visually recognized due to current leakage inside the pixel. In addition, an afterimage, such as image drag, may be visually recognized according to a bias state change of a driving transistor by driving at various frame frequencies, and a response speed change due to a threshold voltage shift or the like according to a hysteresis characteristic change.

In order to improve image quality, one frame period may include a plurality of non-emission periods and emission periods according to the frame frequency. For example, initial non-emission period and emission period (for example, a first non-emission period and a first emission period) of one frame may be defined as a first driving period, and a subsequent non-emission period and emission period (for example, a second non-emission period and a second emission period) may be defined as a second driving period.

For example, a data signal for displaying an image may be written or substantially written to the pixel PX in the first driving period, and an on-bias may be applied to the driving transistor of the pixel PX in the second driving period.

The pixel unit 100 may include scan lines S11 to S1*n*, S21 to S2*n*, S31 to S3*n*, S41 to S4*n*, and S51 to S5*n*, emission control lines E1 to En, and data lines D1 to Dm (where n and m are integers greater than 1). The pixel unit 100 may include the pixels PX connected to the scan lines S11 to S1*n*, S21 to S2*n*, S31 to S3*n*, S41 to S4*n*, and S51 to S5*n*, the emission control lines E1 to En, and the data lines D1 to Dm. Each of the pixels PX may include a driving transistor, and a plurality of switching transistors. The pixels PX may receive a first power voltage VDD, a second power voltage VSS, a third power voltage Vint1 (e.g., a first initialization voltage), a fourth power voltage Vint2 (e.g., a second initialization voltage), a fifth power voltage Vpre (e.g., a pre-charging voltage), and a sixth power voltage VEH (e.g., a bias voltage) from the power supply 500.

In an embodiment of the present disclosure, the signal lines connected to the pixel PX may be variously determined in response to a circuit structure of the pixel PX.

The timing controller 600 may receive input image data IRGB and control signals Sync and DE from a host system, such as an application processor (AP), through a suitable interface (e.g., a predetermined interface). The timing controller 600 may control driving timings of the scan driver 200, the emission driver 300, and the data driver 400.

The timing controller 600 may generate a first control signal SCS, a second control signal ECS, a third control signal DCS, and a fourth control signal PCS based on the input image data IRGB, a synchronization signal Sync (e.g., a vertical synchronization signal, a horizontal synchronization signal, and the like), a data enable signal DE, a clock signal, and the like. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may rearrange the input image data IRGB, and supply the rearranged input image data IRGB to the data driver 400.

The scan driver 200 may receive the first control signal SCS from the timing controller 600. The scan driver 200 may supply a first scan signal to first scan lines S11 to S1*n*, a second scan signal to second scan lines S21 to S2*n*, a third scan signal to third scan lines S31 to S3*n*, a fourth scan signal to fourth scan lines S41 to S4*n*, and a fifth scan signal to fifth scan lines S51 to S5*n*, based on the first control signal SCS.

The first to fifth scan signals may have (e.g., may be set to) a gate-on voltage (e.g., a low voltage) corresponding to a type of a transistor to which the corresponding scan signals are supplied. The transistor receiving the scan signal may be turned on (e.g., may be set to a turn-on state) when the scan signal is supplied. For example, the gate-on voltage of a scan signal supplied to a P-channel metal oxide semiconductor (PMOS) transistor may be a logic low level, and the gate-on voltage of a scan signal supplied to an N-channel metal oxide semiconductor (NMOS) transistor may be a logic high level. Hereinafter, the phrase "the scan signal is supplied" may be understood as the scan signal that is supplied at a logic level that turns on a transistor controlled by the scan signal.

The emission driver 300 may supply an emission control signal to the emission control lines E1 to En based on the second control signal ECS. For example, the emission control signal may be sequentially supplied to the emission control lines E1 to En.

The emission control signal may have (e.g., may be set to) a gate-off voltage (e.g., a high voltage). The transistor receiving the emission control signal may be turned off when the emission control signal is supplied, and may be turned on (e.g., may be set to a turn-on state) in other cases. Hereinafter, the phrase "the emission control signal is supplied" may be understood as the emission control signal that is supplied at a logic level that turns off a transistor controlled by the emission control signal.

In FIG. 1, each of the scan driver 200 and the emission driver 300 is shown in a single configuration for convenience of illustration, but the present disclosure is not limited thereto. According to a design, the scan driver 200 may include a plurality of scan drivers that supply at least one of the first to fifth scan signals, respectively. In addition, at least a portion of the scan driver 200 and the emission driver 300 may be integrated into one driving circuit, module, or the like (e.g., into the same driving circuit, module, or the like).

The data driver 400 may receive the third control signal DCS and image data RGB from the timing controller 600. The data driver 400 may convert digital image data RGB into an analog data signal (e.g., a data voltage). The data driver 400 may supply a data signal to the data lines D1 to Dm in response to the third control signal DCS. The data signal supplied to the data lines D1 to Dm may be supplied in synchronization with the fourth scan signal supplied to the fourth scan lines S41 to S4*n*.

The power supply 500 may supply the first power voltage VDD and the second power voltage VSS to the pixel unit 100 for driving the pixels PX. A voltage level of the second power voltage VSS may be lower than a voltage level of the first power voltage VDD. For example, the first power voltage VDD may be a positive voltage, and the second power voltage VSS may be a negative voltage.

The power supply 500 may supply the third power voltage Vint1 (hereinafter, referred to as the first initialization voltage), the fourth power voltage Vint2 (hereinafter, referred to as the second initialization voltage), the fifth power voltage (hereinafter, referred to as the pre-charging voltage), and the sixth power voltage (hereinafter, referred to as the bias voltage) to the pixel unit 100.

An initialization voltage (for example, the first initialization voltage Vint1 and the second initialization voltage Vint2) may be a power voltage that initializes the pixel PX. For example, the driving transistor and/or a light emitting element included in the pixel PX may be initialized by the initialization voltage. For example, the initialization voltage may include the first initialization voltage Vint1 and the second initialization voltage Vint2, which may be output at different voltage levels from each other.

The bias voltage VEH may be a voltage for supplying a suitable bias (e.g., a predetermined bias) to a source electrode and/or a drain electrode of the driving transistor included in the pixel PX. For example, the bias voltage VEH may be a positive voltage. However, a voltage level of the bias voltage VEH is not limited thereto, and the bias voltage VEH may be a negative voltage.

The pre-charging voltage Vpre may be a voltage for pre-charging the light emitting element (for example, a parasitic capacitor of the light emitting element) included in the pixel PX. For example, the pre-charging voltage Vpre may be supplied to the light emitting element immediately before an emission period of the pixel PX, and thus, the light emitting element (for example, the parasitic capacitor of the light emitting element) may be pre-charged by the pre-charging voltage Vpre. Accordingly, the light emitting element may emit light with a fast response speed, and a luminance non-uniformity phenomenon according to a deterioration of the light emitting element may be improved.

Figure 2:
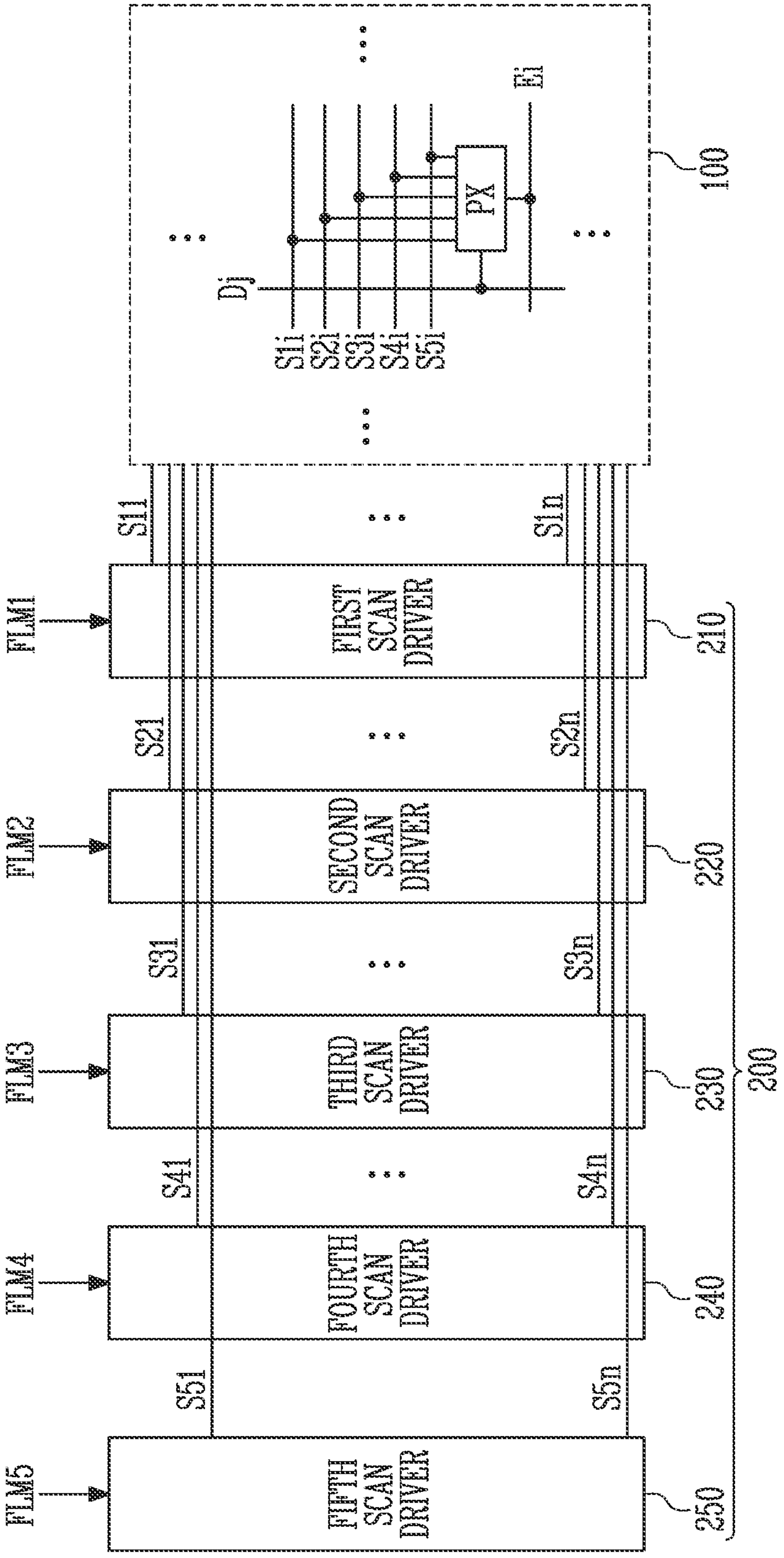
FIG. 2 is a diagram illustrating an example of a scan driver included in the display device of FIG. 1.

FIG. 2 is a diagram illustrating an example of the scan driver included in the display device of FIG. 1.

Referring to FIGS. 1 and 2, the scan driver 200 may include a first scan driver 210, a second scan driver 220, a third scan driver 230, a fourth scan driver 240, and a fifth scan driver 250.

The first control signal SCS may include first to fifth scan start signals FLM1 to FLM5. The first to fifth scan start signals FLM1 to FLM5 may be supplied to the first to fifth scan drivers 210, 220, 230, 240, and 250, respectively.

A width, a supply timing, and the like of the first to fifth scan start signals FLM1 to FLM5 may be determined according to a driving condition and a frame frequency of the pixel PX. The first to fifth scan signals may be output based on the first to fifth scan start signals FLM1 to FLM5, respectively. For example, a signal width of at least one of the first to fifth scan signals may be different from a signal width of the other remaining scan signals.

The first scan driver 210 may sequentially supply the first scan signal to the first scan lines S11 to S1*n* in response to the first scan start signal FLM1. The second scan driver 220 may sequentially supply the second scan signal to the second scan lines S21 to S2*n* in response to the second scan start signal FLM2. The third scan driver 230 may sequentially supply the third scan signal to the third scan lines S31 to S3*n* in response to the third scan start signal FLM3. The fourth scan driver 240 may sequentially supply the fourth scan signal to the fourth scan lines S41 to S4*n* in response to the fourth scan start signal FLM4. The fifth scan driver 250 may sequentially supply the fifth scan signal to the fifth scan lines S51 to S5*n* in response to the fifth scan start signal FLM5.

Figure 3:
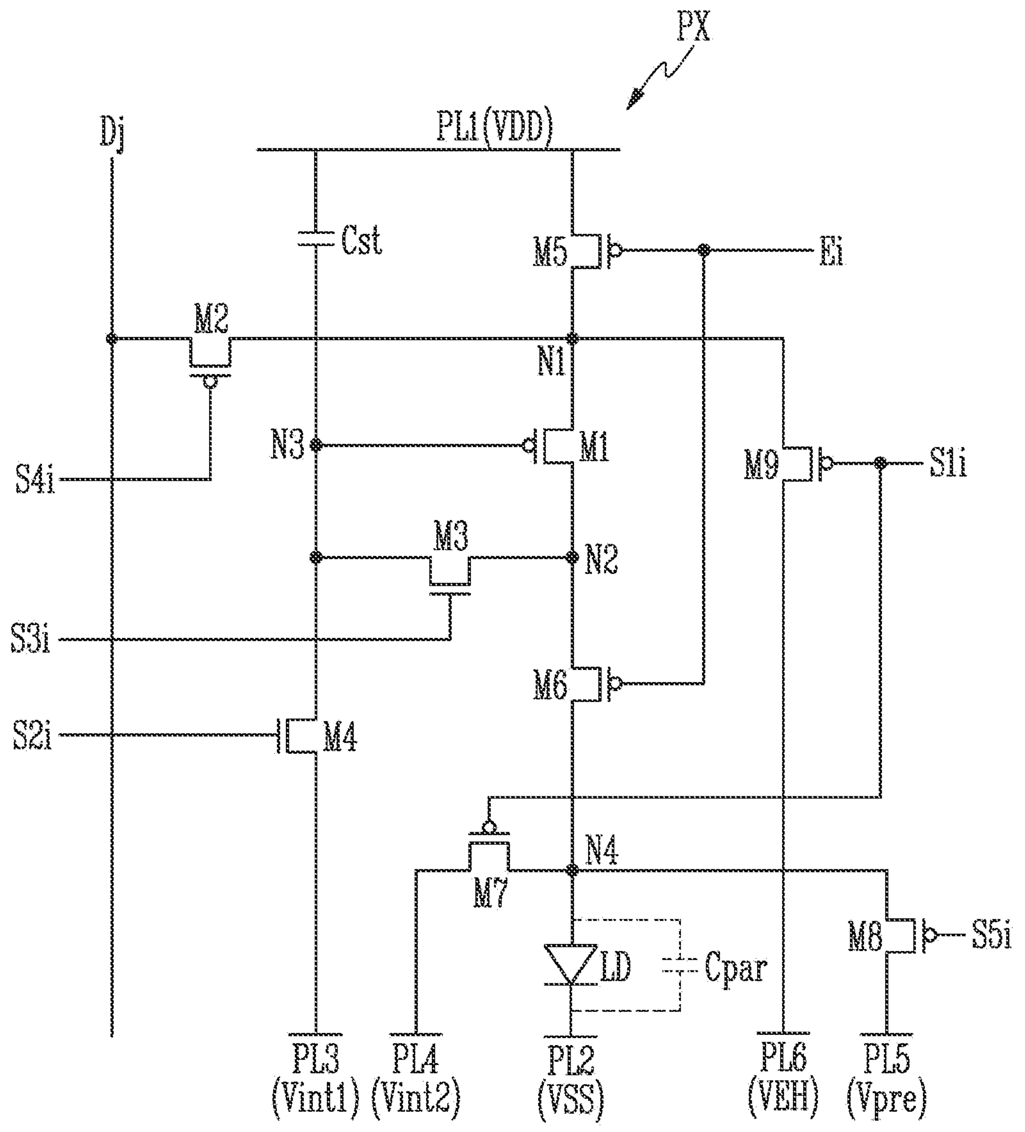
FIG. 3 is a circuit diagram illustrating an example of a pixel included in the display device of FIG. 1.

FIG. 3 is a circuit diagram illustrating an example of the pixel included in the display device of FIG. 1.

In FIG. 3, the pixel PX positioned at (e.g., in or on) an i-th horizontal line (e.g., an i-th pixel row) and connected to a j-th data line Dj is shown for convenience of illustration (where, i and j are natural numbers). The pixel PX (e.g., each of the pixels PX) shown in FIG. 1 may have the same or substantially the same structure as that of the pixel PX shown in FIG. 3, and thus, redundant description thereof may not be repeated.

Referring to FIGS. 1 and 3, the pixel PX may include a light emitting element LD, first to ninth transistors M1 to M9, and a first capacitor Cst (e.g., a storage capacitor).

A first electrode (e.g., an anode electrode, or a cathode electrode) of the light emitting element LD may be connected to a fourth node N4 (or the sixth transistor M6), and a second electrode (e.g., a cathode electrode, or an anode electrode) of the light emitting element LD may be connected to a second power line PL2 for transmitting the second power voltage VSS. The light emitting element LD may generate light having a desired luminance (e.g., a predetermined luminance) in response to a current amount (e.g., a driving current) supplied from the first transistor M1.

The second power line PL2 may have a line shape, but is not limited thereto. For example, the second power line PL2 may be a conductive layer having a conductive plate shape.

In an embodiment, the light emitting element LD may be an organic light emitting diode including an organic light emitting layer. In another embodiment, the light emitting element LD may be an inorganic light emitting diode formed of an inorganic material, such as a micro light emitting diode (LED) or a quantum dot light emitting diode. In another embodiment, the light emitting element LD may be configured of an organic material and an inorganic material in combination with each other.

While FIG. 3 shows that the pixel PX includes a single light emitting element LD, in another embodiment, the pixel PX may include a plurality of light emitting elements. In this case, the plurality of light emitting elements may be connected in series, in parallel, or in series-parallel with each other. For example, the light emitting element LD may have a shape or a structure in which the plurality of light emitting elements (for example, which may include organic light emitting elements and/or inorganic light emitting elements) are connected in series, in parallel, or in series-parallel with each other between the second power line PL2 and the fourth node N4.

A first electrode of the first transistor M1 (e.g., the driving transistor) may be connected to a first node N1, and a second electrode thereof may be connected to a second node N2. A gate electrode of the first transistor M1 may be connected to a third node N3. The first transistor M1 may control the driving current (for example, a current amount of the driving current) flowing from a first power line PL1 for providing the first power voltage VDD to the second power line PL2 for providing the second power voltage VSS via the light emitting element LD, in response to a voltage of the third node N3. In this case, the first power voltage VDD may have (e.g., may be set to) a voltage higher than that of the second power voltage VSS. For example, the first power voltage VDD may be a positive voltage, and the second power voltage VSS may be a negative voltage.

The second transistor M2 may be connected between the j-th data line Dj (hereinafter, referred to as a data line) and the first node N1. A gate electrode of the second transistor M2 may be connected to an i-th fourth scan line S4*i* (hereinafter, referred to as a fourth scan line). The second transistor M2 may be turned on, when the fourth scan signal is supplied to the fourth scan line S4*i*, to electrically connect the data line Dj and the first node N1 to each other.

The third transistor M3 may be connected between the second electrode (e.g., the second node N2) and the gate electrode (e.g., the third node N3) of the first transistor M1. A gate electrode of the third transistor M3 may be connected to an i-th third scan line S3*i* (hereinafter, referred to as a third scan line). The third transistor M3 may be turned on, when the third scan signal is supplied to the third scan line S3*i*, to electrically connect the second electrode and the gate electrode of the first transistor M1 (for example, the second node N2 and the third node N3) to each other. In other words, a timing at which the second electrode (e.g., the drain electrode) and the gate electrode of the first transistor M1 are connected to each other may be controlled by the third scan signal. When the third transistor M3 is turned on, the first transistor M1 may be connected in a diode form (e.g., may be diode-connected).

The fourth transistor M4 may be connected between the third node N3 and a third power line PL3 for providing the first initialization voltage Vint1. A gate electrode of the fourth transistor M4 may be connected to an i-th second scan line S2*i* (hereinafter, referred to as a second scan line). The fourth transistor M4 may be turned on when the second scan signal is supplied to the second scan line S2*i*, to supply the first initialization voltage Vint1 to the third node N3. Here, the first initialization voltage Vint1 may have (e.g., may be set to) a voltage lower than that of a lowest level of the data signal supplied to the data line Dj.

The fourth transistor M4 may be turned on by the supply of the second scan signal, and thus, a voltage of the gate electrode (e.g., the third node N3) of the first transistor M1 may be initialized to the first initialization voltage Vint1.

The fifth transistor M5 may be connected between the first power line PL1 and the first node N1. A gate electrode of the fifth transistor M5 may be connected to an i-th emission control line Ei (hereinafter, referred to as an emission control line). The fifth transistor M5 may be turned off when the emission control signal is supplied to the emission control line Ei, and may be turned on in other cases. When the fifth transistor M5 is turned on, the first node N1 may be electrically connected to the first power line PL1.

The sixth transistor M6 may be connected between the second electrode (e.g., the second node N2) of the first transistor M1 and the first electrode (e.g., the fourth node N4) of the light emitting element LD. A gate electrode of the sixth transistor M6 may be connected to the emission control line Ei. The sixth transistor M6 may be controlled identically or substantially identically to the fifth transistor M5. When the sixth transistor M6 is turned on, the second node N2 and the fourth node N4 may be electrically connected to each other.

In FIG. 3, the fifth transistor M5 and the sixth transistor M6 are connected to the same emission control line Ei, but this is provided as an example, and the present disclosure is not limited thereto. For example, the fifth transistor M5 and the sixth transistor M6 may be connected to separate emission control lines, respectively, to which different emission control signals are supplied.

The seventh transistor M7 may be connected between the first electrode (e.g., the fourth node N4) of the light emitting element LD and a fourth power line PL4 for providing the second initialization voltage Vint2. In an embodiment, a gate electrode of the seventh transistor M7 may be connected to an i-th first scan line S1*i* (hereinafter, referred to as a first scan line). The seventh transistor M7 may be turned on when the first scan signal is supplied to the first scan line S1*i*, to supply the second initialization voltage Vint2 to the fourth node N4 (e.g., the first electrode of the light emitting element LD).

When the seventh transistor M7 is turned on by the supply of the first scan signal, and the second initialization voltage Vint2 is supplied to the first electrode of the light emitting element LD, a second capacitor Cpar (for example, the parasitic capacitor of the light emitting element LD) may be discharged. As a residual voltage charged in the parasitic capacitor Cpar of the light emitting element LD is discharged (e.g., removed), unintentional minute light emission may be prevented or substantially prevented. Therefore, black expression ability of the pixel PX may be improved.

The first initialization voltage Vint1 and the second initialization voltage Vint2 may have different voltage levels from each other. In other words, a voltage (e.g., the first initialization voltage Vint1) for initializing the third node N3 and a voltage (e.g., the second initialization voltage Vint2) for initializing the fourth node N4 may be different from each other.

In low-frequency driving, in which a length of one frame period is increased, when the first initialization voltage Vint1 supplied to the third node N3 is excessively low, because a strong on-bias is applied to the first transistor M1, a threshold voltage of the first transistor M1 in a corresponding frame period may be shifted. Such a hysteresis characteristic may cause a flicker phenomenon in the low-frequency driving. Therefore, in a low-frequency driving display device, the first initialization voltage Vint1 that is higher than the second power voltage VSS may be used.

However, when the second initialization voltage Vint2 supplied to the fourth node N4 for initialization of the light emitting element LD becomes higher than a reference (e.g., a predetermined reference), a voltage of the parasitic capacitor Cpar of the light emitting element LD may not be discharged, but may be charged instead. Therefore, a voltage level of the second initialization voltage Vint2 may be sufficiently low to discharge the voltage of the parasitic capacitor Cpar of the light emitting element LD. For example, in consideration of a threshold voltage of the light emitting element LD, the voltage level of the second initialization voltage Vint2 may be determined, such that the voltage level of the second initialization voltage Vint2 is lower than a value obtained by adding the threshold voltage of the light emitting element LD with the second power voltage VSS.

However, the present disclosure is not limited thereto, and the voltage level of the first initialization voltage Vint1 and the voltage level of the second initialization voltage Vint2 may be variously modified. For example, the voltage level of the first initialization voltage Vint1 and the voltage level of the second initialization voltage Vint2 may be the same or substantially the same as each other.

The eighth transistor M8 may be connected between the first electrode (e.g., the fourth node N4) of the light emitting element LD and a fifth power line PL5 for providing the pre-charging voltage Vpre. A gate electrode of the eighth transistor M8 may be connected to an i-th fifth scan line S5*i* (hereinafter, referred to as a fifth scan line). The eighth transistor M8 may be turned on when the fifth scan signal is supplied to the fifth scan line S5*i*, to supply the pre-charging voltage Vpre to the fourth node N4 (e.g., the first electrode of the light emitting element LD).

When the eighth transistor M8 is turned on by the supply of the fifth scan signal, and the pre-charging voltage Vpre is supplied to the first electrode of the light emitting element LD, the light emitting element LD (for example, the parasitic capacitor Cpar of the light emitting element LD) may be pre-charged. Accordingly, the light emitting element LD may emit light with a fast response speed, and the luminance non-uniformity phenomenon according to a deterioration deviation of the light emitting element LD may be improved.

In an embodiment, a voltage level of the pre-charging voltage Vpre may be higher than the voltage level of the second initialization voltage Vint2. The voltage level of the pre-charging voltage Vpre may be determined (e.g., may be set) in consideration of the threshold voltage of the light emitting element LD. For example, when a difference between the pre-charging voltage Vpre and the second power voltage VSS exceeds the threshold voltage of the light emitting element LD, because the light emitting element LD may emit light in the non-emission period, a maximum value that may be determined (e.g., that may be set) as the voltage level of the pre-charging voltage Vpre may be less than a value obtained by adding the threshold voltage of the light emitting element LD with the second power voltage VSS. For example, the pre-charging voltage Vpre may have a voltage level that is about 1V to 2V higher than the voltage level of the second initialization voltage Vint2. However, this is merely provided as an example, and the voltage level of the pre-charging voltage Vpre may be variously modified.

In an embodiment, the fourth scan line S4*i* connected to the gate electrode of the second transistor M2 and the fifth scan line S5*i* connected to the gate electrode of the eighth transistor M8 may be the same scan line. In this case, a circuit configuration of the pixel PX may be more simplified. This is described in more detail below with reference to FIGS. 8 and 9.

The ninth transistor M9 may be connected between the first node N1 (e.g., the first electrode of the first transistor M1) and a sixth power line PL6 for providing the bias voltage VEH. A gate electrode of the ninth transistor M9 may be connected to the first scan line S1*i*.

The ninth transistor M9 may be turned on when the first scan signal is supplied to the first scan line S1*i*, to supply the bias voltage VEH to the first node N1. In an embodiment, the bias voltage VEH may have a level that is the same or substantially the same as (or similar to) a voltage level of a data signal of a black grayscale (e.g., a black grayscale level). For example, the bias voltage VEH may have a voltage level of about 5 to 7V.

Accordingly, a suitable high voltage (e.g., a predetermined high voltage) may be applied to the first electrode (e.g., the source electrode) of the first transistor M1 by the turned on ninth transistor M9. In this case, when the third transistor M3 is in a turn-off state, the first transistor M1 may have an on-bias state, or in other words, the first transistor M1 may be on-biased (e.g., a state in which the first transistor M1 may be turned on).

Here, as the bias voltage VEH may be periodically supplied to the first node N1, the bias state of the first transistor M1 may be periodically changed, and a threshold voltage characteristic of the first transistor M1 may be changed. Therefore, a characteristic of the first transistor M1 may be prevented or substantially prevented from being fixed in a specific state, and from being deteriorated in the low-frequency driving.

The first capacitor Cst (e.g., the storage capacitor) may be connected between the first power line PL1 and the third node N3. As one electrode of the storage capacitor Cst is connected to the first power line PL1, the first power voltage VDD, which is a constant or substantially constant voltage, may be continuously supplied to the one electrode of the storage capacitor Cst. Therefore, the voltage of the third node N3 may be maintained or substantially maintained at a voltage level of a voltage that is directly supplied to the third node N3, without being affected by another parasitic capacitor. In other words, the first capacitor Cst may store the voltage that is applied to the third node N3.

The first transistor M1, the second transistor M2, the fifth transistor M5, the sixth transistor M6, the seventh transistor M7, the eighth transistor M8, and the ninth transistor M9 may be formed of a polysilicon semiconductor transistor. For example, the first transistor M1, the second transistor M2, the fifth transistor M5, the sixth transistor M6, the seventh transistor M7, the eighth transistor M8, and the ninth transistor M9 may include a polysilicon semiconductor layer formed through a low temperature poly-silicon (LTPS) process as an active layer (e.g., a channel). In addition, the first transistor M1, the second transistor M2, the fifth transistor M5, the sixth transistor M6, the seventh transistor M7, the eighth transistor M8, and the ninth transistor M9 may be a P-type transistor (e.g., a PMOS transistor). Accordingly, a gate-on voltage that turns on the first transistor M1, the second transistor M2, the fifth transistor M5, the sixth transistor M6, the seventh transistor M7, the eighth transistor M8, and the ninth transistor M9 may be a logic low level.

Because the polysilicon semiconductor transistor has fast response speeds, the polysilicon semiconductor transistor may be applied to a switching element desiring fast switching.

The third transistor M3 and the fourth transistor M4 may be formed of an oxide semiconductor transistor. For example, the third transistor M3 and the fourth transistor M4 may be an N-type oxide semiconductor transistor (e.g., an NMOS transistor), and may include an oxide semiconductor layer as an active layer. Accordingly, a gate-on voltage that turns on the third transistor M3 and the fourth transistor M4 may be a logic high level.

The oxide semiconductor transistor may be processed at a low temperature, and has a charge mobility lower than that of a polysilicon semiconductor transistor. In other words, the oxide semiconductor transistor has excellent off current characteristics. Therefore, when the third transistor M3 and the fourth transistor M4 are formed of an oxide semiconductor transistor, a leakage current from the third node N3 according to the low-frequency driving may be minimized or reduced, and thus, display quality may be improved.

However, the first to ninth transistors M1 to M9 are not limited to the examples provided above, and at least one of the first transistor M1, the second transistor M2, the fifth transistor M5, the sixth transistor M6, the seventh transistor M7, the eighth transistor M8, and the ninth transistor M9 may be formed of an oxide semiconductor transistor, and/or at least one of the third transistor M3 and the fourth transistor M4 may be formed of a polysilicon semiconductor transistor.

Figure 4:
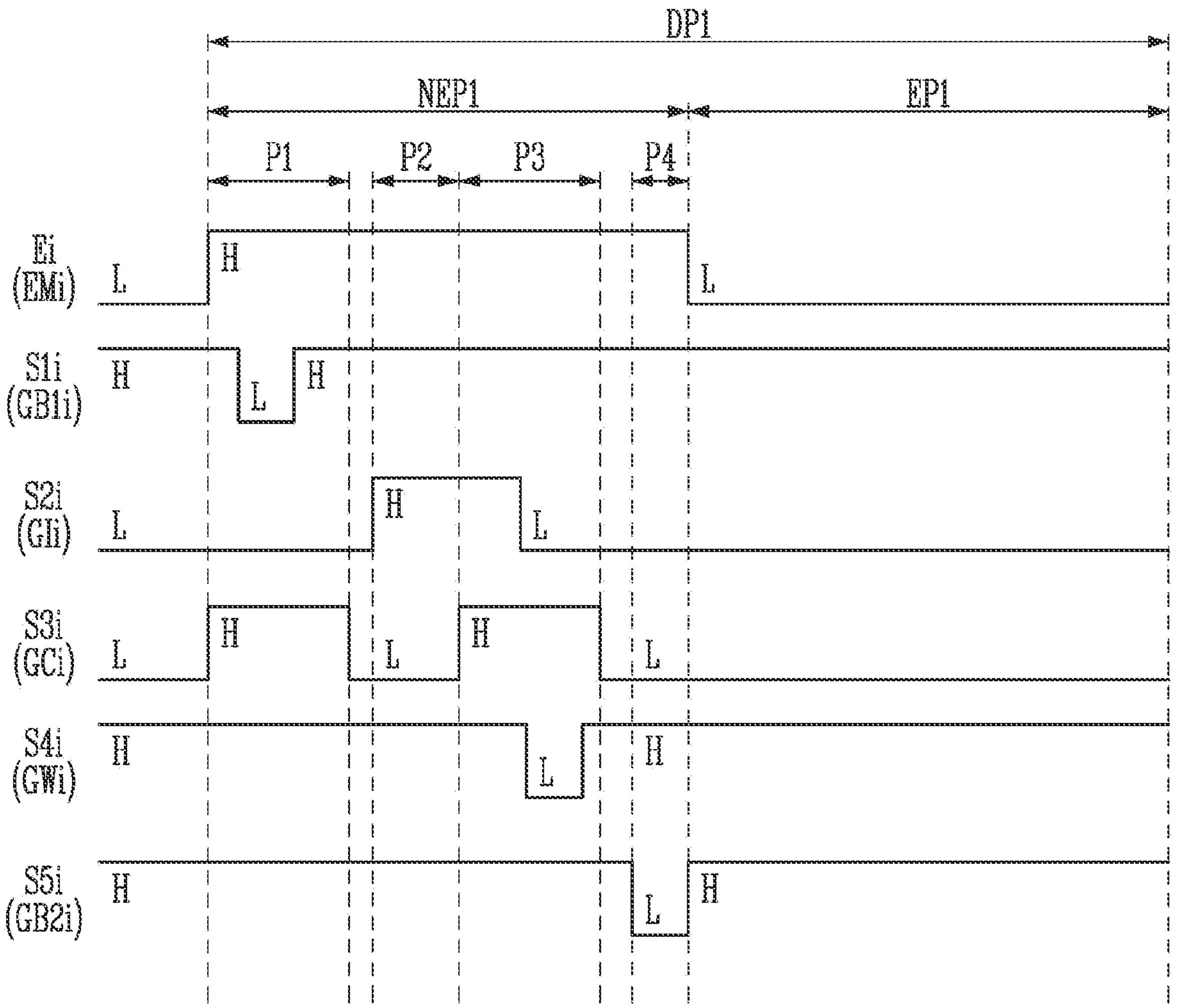
FIG. 4 is a timing diagram illustrating an example of signals supplied to the pixel of FIG. 3 during a first driving period.
Figure 5A:
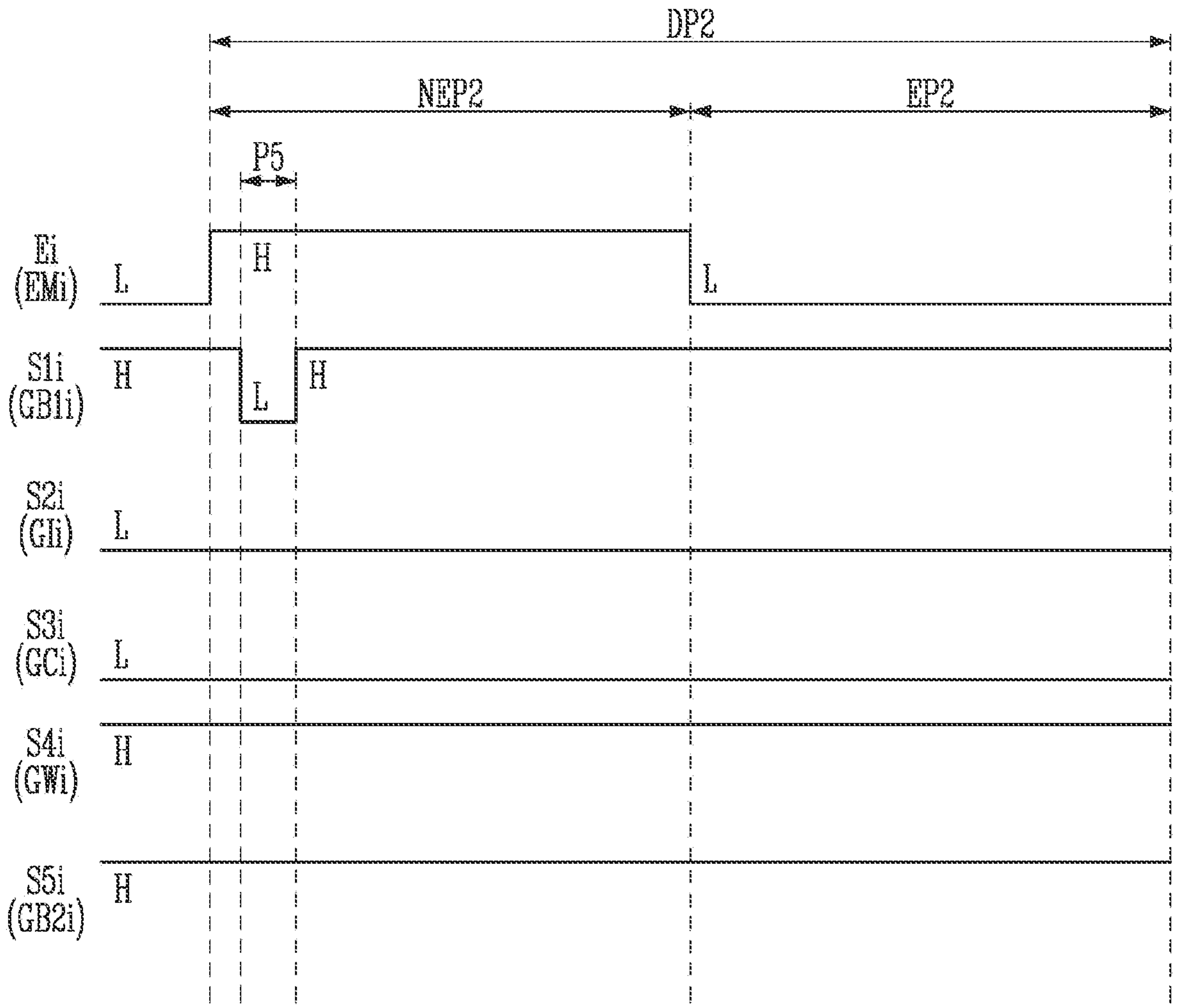
FIGS. 5A-5B are timing diagrams illustrating an example of signals supplied to the pixel of FIG. 3 during a second driving period.
Figure 5B:
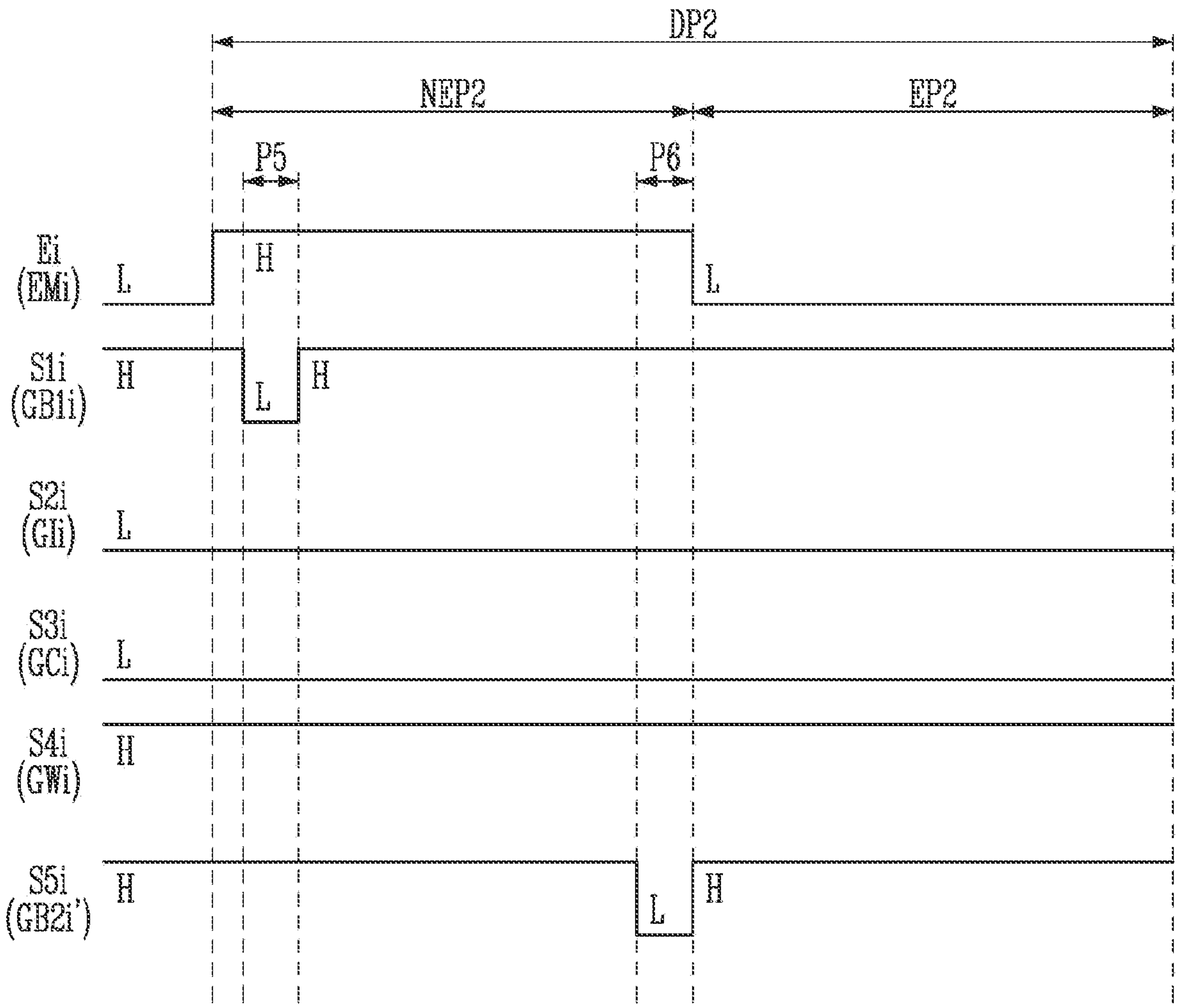

FIG. 4 is a timing diagram illustrating an example of signals supplied to the pixel of FIG. 3 during the first driving period. FIGS. 5A and 5B are timing diagrams illustrating an example of signals supplied to the pixel of FIG. 3 during the second driving period.

Referring to FIGS. 3, 4, 5A, and 5B, the pixel PX may operate through a first driving period DP1 and/or a second driving period DP2.

In variable frequency driving for controlling a frame frequency, one frame period may include the first driving period DP1. In addition, the second driving period DP2 may be omitted as needed or desired, or may proceed at least once according to the frame frequency.

The first driving period DP1 may include a first non-emission period NEP1 and a first emission period EP1. The second driving period DP2 may include a second non-emission period NEP2 and a second emission period EP2. Here, the first and second non-emission periods NEP1 and NEP2 may correspond to a period in which a path of the driving current flowing from the first power line PL1 to the second power line PL2 via the light emitting element LD is blocked, and the first and second emission periods EP1 and EP2 may correspond to a period in which the path of the driving current is formed and the light emitting element LD emits light based on the driving current.

The first driving period DP1 may include a period in which a data signal actually corresponding to an output image is written. For example, when a still image is displayed by low-frequency driving, the data signal may be written in every first driving period DP1. In the second driving period DP2, the data signal may not be supplied, and a first scan signal GB1*i* may be supplied to the first scan line S1*i* to control the first transistor M1 of the pixel PX to be in an on-bias state, and to initialize the light emitting element LD.

As shown in FIGS. 4 and 5A, the first non-emission period NEP1 may include first to fourth periods P1 to P4, and the second non-emission period NEP2 may include a fifth period P5.

In an embodiment, second to fourth scan signals Gli, GCi, and GWi supplied to the second to fourth scan lines S2*i*, S3*i*, and S4*i*, respectively, may be supplied during (e.g., only during) the first non-emission period NEP1. The third scan signal GCi may be supplied a plurality of times during the first non-emission period NEP1.

In an embodiment, as shown in FIGS. 4 and 5A, a fifth scan signal GB2*i* supplied to the fifth scan line S5*i* may be supplied during (e.g., only during) the first non-emission period NEP1. However, the present disclosure is not limited thereto. For example, as shown in FIG. 5B, a fifth scan signal GB2*i*' supplied to the fifth scan line S5*i* may also be supplied during the second non-emission period NEP2.

In an embodiment, the first scan signal GB1*i* supplied to the first scan line S1*i* may be supplied during the first non-emission period NEP1 and the second non-emission period NEP2.

In an embodiment, each of the first scan signal GB1*i* and the fourth scan signal GWi may overlap with the third scan signal GCi in at least a partial period.

The second scan signal Gli and the third scan signal GCi supplied to the n-type oxide semiconductor transistor (e.g., the third transistor M3 and the fourth transistor M4) may be a high level H, and the first scan signal GB1*i*, the fourth scan signal GWi, and the fifth scan signal GB2*i* supplied to the p-type polysilicon semiconductor transistors (e.g., the second transistor M2, the seventh transistor M7, the eighth transistor M8, and the ninth transistor M9) may be a low level L.

The first to fifth scan signals GB1*i*, GCi, Gli, GWi, and GB2*i* may be supplied from the scan driver (e.g., the scan driver 200 of FIG. 1). For example, the first to fifth scan signals GB1*i*, GCi, Gli, GWi, and GB2*i* may be supplied from the first to fifth scan drivers 210, 220, 230, 240, and 250, respectively, as shown in FIG. 2.

An emission control signal EMi supplied to the emission control line Ei may be maintained or substantially maintained as the high level H (e.g., a gate-off level) during the first non-emission period NEP1 of the first driving period DP1, and may be maintained or substantially maintained as the high level H (e.g., the gate-off level) during the second non-emission period NEP2 of the second driving period DP2. Accordingly, each of the fifth transistor M5 and the sixth transistor M6 may maintain a turn-off state during the first non-emission period NEP1 and the second non-emission period NEP2. Accordingly, the path of the driving current flowing from the first power line PL1 to the second power line PL2 via the light emitting element LD may be blocked during the first non-emission period NEP1 and the second non-emission period NEP2.

Hereinafter, the scan signals GB1*i*, Gli, GCi, GWi, and GB2*i* supplied in the first driving period DP1 and the second driving period DP2, and an operation of the pixel PX are described in more detail with reference to FIGS. 3, 4, 5A, and 5B.

First, referring to FIGS. 3 and 4, in the first driving period DP1, the emission control line EMi of the high level H (e.g., the gate-off level) may be supplied to the emission control line Ei during the first non-emission period NEP1. Accordingly, the fifth transistor M5 and the sixth transistor M6 may be turned off during the first non-emission period NEP1. The first non-emission period NEP1 may include the first to fourth periods P1 to P4.

In the first period P1, the third scan signal GCi may be supplied to the third scan line S3*i*, and the first scan signal GB1*i* may be supplied to the first scan line S1*i*. In an embodiment, after the third scan signal GCi is supplied, the first scan signal GB1*i* may be supplied. Therefore, after the third transistor M3 is turned on in the first period P1, the ninth transistor M9 may be turned on.

When the ninth transistor M9 is turned on without the supply of the third scan signal GCi, the bias voltage VEH may be supplied to the first node N1 (e.g., the source electrode of the first transistor M1). In this case, the high voltage of the bias voltage VEH may be applied to the first node N1, and thus, the first transistor M1 may have the on-bias state. For example, when the bias voltage VEH is about 5V or more, the first transistor M1 may have a source voltage and a drain voltage of about 5V or more, and an absolute value of a gate-source voltage of the first transistor M1 may increase.

In such a state, when the data signal is supplied by the supply of the fourth scan signal GWi, the driving current may unintentionally change due to an influence of the bias state of the first transistor M1, and an image luminance may be shaken (e.g., the luminance increases).

To prevent or substantially prevent such a case, in the first period P1, the scan driver (e.g., the scan driver 200 of FIG. 1) may first supply the third scan signal GCi prior to the first scan signal GB1*i*. Therefore, the third transistor M3 may be turned on prior to the ninth transistor M9. The second node N2 and the third node N3 may conduct by the turned on third transistor M3. Thereafter, when the ninth transistor M9 is turned on, the bias voltage VEH may be transmitted to the third node N3 through the first node N1. For example, a voltage difference between the first node N1 and the third node N3 may be decreased to a threshold voltage level of the first transistor M1. Therefore, in the first period P1, a magnitude of the gate-source voltage of the first transistor M1 may be greatly decreased. For example, the first transistor M1 may be in (e.g., may be set to) an off-bias state.

As described above, in order to prevent or substantially prevent an unintentional luminance increase due to the supply of the bias voltage VEH before the data signal is written in the first period P1, the supply of the first scan signal GB1*i* and the third scan signal GCi may be controlled, so that the ninth transistor M9 is turned on in a state in which the third transistor M3 is turned on (e.g., in a state in which the third transistor M3 is already turned on).

In an embodiment, in the first period P1, a width of the third scan signal GCi (for example, a width of a period in which the third scan signal GCi is supplied as the high level H) may be greater than a width of the first scan signal GB1*i* (for example, a width of a period in which the first scan signal GB1*i* is supplied as the low level L). For example, in the first period P1, the third transistor M3 may be turned on prior to the ninth transistor M9, and after the ninth transistor M9 is turned off, the third transistor M3 may be turned off.

However, this is provided as an example, and the third transistor M3 may be turned off prior to the ninth transistor M9 being turned off.

In the first period P1, the second initialization voltage Vint2 may be supplied to the fourth power line PL4. During a period in which the first scan signal GB1*i* of the low level L (e.g., a gate-on level) is supplied in the first period P1, the seventh transistor M7 may be turned on in response to the first scan signal GB1*i*, and the second initialization voltage Vint2 may be supplied to the first electrode (e.g., the fourth node N4) of the light emitting element LD. Accordingly, the first electrode of the light emitting element LD may be initialized based on the second initialization voltage Vint2. In other words, the parasitic capacitor Cpar of the light emitting element LD may be discharged by the second initialization voltage Vint2. Accordingly, the black expression ability of the pixel PX may be improved.

Thereafter, in the second period P2, the second scan signal Gli may be supplied to the second scan line S2*i*. The fourth transistor M4 may be turned on by the second scan signal Gli. When the fourth transistor M4 is turned on, the first initialization voltage Vint1 may be supplied to the gate electrode of the first transistor M1. In other words, in the second period P2, a gate voltage of the first transistor M1 may be initialized based on the first initialization voltage Vint1. Therefore, a strong on-bias may be applied to the first transistor M1, and the hysteresis characteristics may be changed (e.g., the threshold voltage thereof is shifted).

The supply of the second scan signal Gli may be maintained or substantially maintained after the second period P2. For example, as shown in FIG. 4, the second scan signal Gli may maintain or substantially maintain the high level H (e.g., the gate-on level) during at least a portion of the third period P3 after the second period P2. However, the present disclosure is not limited thereto, and the second scan signal Gli may transit from the high level H to the low level L in response to a time point at which the second period P2 is ended.

In the third period P3, the third scan signal GCi may be supplied to the third scan line S3*i*. The third transistor M3 may be turned on again in response to the third scan signal GCi. In the third period P3, the fourth scan signal GWi may be supplied to the fourth scan line S4*i* to overlap with a portion of the third scan signal GCi. The second transistor M2 may be turned on by the fourth scan signal GWi, and the data signal may be provided to the first node N1.

In this case, the first transistor M1 may be connected in a diode form by the turned-on third transistor M3, and data signal writing and threshold voltage compensation may be performed. Because the third scan signal GCi is supplied before the fourth scan signal GWi is supplied and after the supply of the fourth scan signal GWi is stopped, the threshold voltage of the first transistor M1 may be compensated during a sufficient time.

Thereafter, in the fourth period P4, the fifth scan signal GB2*i* may be supplied to the fifth scan line S5*i*. Therefore, the eighth transistor M8 may be turned on.

When the eighth transistor M8 is turned on, the pre-charging voltage Vpre supplied to the fifth power line PL5 may be provided to the first electrode (e.g., the fourth node N4) of the light emitting element LD. Accordingly, the light emitting element LD may be pre-charged to the voltage level of the pre-charging voltage Vpre. For example, the parasitic capacitor Cpar of the light emitting element LD may be charged with the pre-charging voltage Vpre. As described above, in the fourth period P4 immediately before the first emission period EP1 in which the light emitting element LD emits light, the light emitting element LD may be pre-charged with the pre-charging voltage Vpre having a voltage level higher than the voltage level of the second initialization voltage Vint2 for initializing the light emitting element LD. In other words, because the parasitic capacitor Cpar of the light emitting element LD is pre-charged immediately before the first emission period EP1, a current amount to charge the light emitting element LD (e.g., the parasitic capacitor Cpar of the light emitting element LD) may be reduced. Accordingly, the light emitting element LD may emit light with a fast response speed.

When the light emitting element LD is deteriorated according to long term driving of the display device (e.g., the display device 1000 of FIG. 1), a capacitance of the parasitic capacitor Cpar of the light emitting element LD may decrease. In this case, a difference in a deterioration degree may exist for different light emitting elements LD (e.g., for each light emitting element LD), and luminance uniformity may be reduced due to the deterioration variation of the light emitting elements LD between the pixels PX. For example, in a case of the pixel PX in which the deterioration of the light emitting element LD is not progressed relatively, a decrease amount of the capacitance of the parasitic capacitor Cpar of the light emitting element LD may be relatively small, whereas in a case of the pixel PX in which the deterioration of the light emitting element LD is greatly progressed relatively, the decrease amount of the capacitance of the parasitic capacitor Cpar of the light emitting element LD may be relatively great. Here, in a low luminance area where the current amount supplied from the first transistor M1 to the light emitting element LD is relatively small, a current amount for charging the light emitting element LD (e.g., the parasitic capacitor Cpar of the light emitting element LD) may be relatively small. In this case, in the pixel PX in which the deterioration of the light emitting element LD is not progressed relatively, because the capacitance of the parasitic capacitor Cpar of the light emitting element LD is relatively high, and thus, a charge ratio by the current supplied to the light emitting element LD is low, a luminance of light emitted by the light emitting element LD may be relatively low. On the other hand, in the pixel PX in which the deterioration of the light emitting element LD is greatly progressed relatively, because the capacitance of the parasitic capacitor Cpar of the light emitting element LD is relatively low, and thus, the charge ratio may be relatively high even though the current amount supplied to the light emitting element LD is relatively low, the luminance of the light emitted by the light emitting element LD may be relatively high.

In a case of the pixel PX (e.g., the display device 1000 including the pixel PX) according to one or more embodiments of the present disclosure, because the light emitting element LD (e.g., the parasitic capacitance Cpar of the light emitting element LD) is pre-charged by the pre-charging voltage Vpre having the voltage level higher than the voltage level of the second initialization voltage Vint2 immediately before the emission period (for example, the first emission period EP1 of the first driving period DP1), the luminance non-uniformity phenomenon according to the deterioration deviation of the light emitting element LD may be improved, even in a low luminance area where the current amount supplied to the light emitting element LD is relatively low.

After the fourth period P4, the supply of the emission control signal EMi to the emission control line Ei may be stopped (for example, the emission control signal EMi may transit to the low level L). Therefore, the first non-emission period NEP1 may be ended and the first emission period EP1 may proceed. In the first emission period EP1, the fifth and sixth transistors M5 and M6 may be turned on.

In the first emission period EP1, a driving current corresponding to a data signal written in the third period P3 may be supplied to the light emitting element LD, and the light emitting element LD may emit light based on the driving current.

Referring to FIGS. 3 and 5A, the second driving period DP2 may include the second non-emission period NEP2 and the second emission period EP2. The second non-emission period NEP2 may include the fifth period P5.

In an embodiment, a waveform of the emission control signal EMi in the second driving period DP2 may be the same or substantially the same as a waveform of the emission control signal EMi in the first driving period DP1.

In an embodiment, in the second driving period DP2, the second to fourth scan signals Gli, GCi, and GWi may not be supplied. For example, in the second driving period DP2, the second and third scan signals Gli and GCi of the low level L (e.g., the gate-off level) may be supplied to the second and third scan lines S2*i* and S3*i*, respectively, and the fourth scan signal GWi of the high level H (e.g., the gate-off level) may be supplied to the fourth scan line S4*i*. Accordingly, in the second driving period DP2, the second to fourth transistors M2, M3, and M4 may maintain a turn-off state.

In the fifth period P5 of the second non-emission period NEP2, the first scan signal GB1*i* may be supplied to the first scan line S1*i*. For example, in the fifth period P5, the first scan signal GB1*i* of the low level L (e.g., the gate-on level) may be supplied to the first scan line S1*i*. Accordingly, the seventh and ninth transistors M7 and M9 may be turned on.

Because the seventh transistor M7 is turned on in the fifth period P5, the second initialization voltage Vint2 may be supplied to the first electrode (e.g., the fourth node N4) of the light emitting element LD. Accordingly, the first electrode of the light emitting element LD may be initialized based on the second initialization voltage Vint2.

In addition, because the ninth transistor M9 is turned on in the fifth period P5, the bias voltage VEH may be supplied to the first electrode (e.g., the first node N1) of the first transistor M1.

After the fifth period P5, the supply of the emission control signal EMi to the emission control line Ei may be stopped (for example, the emission control signal EMi may transit to the low level L). Therefore, the second non-emission period NEP2 may be ended, and the second emission period EP2 may proceed. In the second emission period EP2, the fifth and sixth transistors M5 and M6 may be turned on.

In the second emission period EP2, a driving current corresponding to a data signal written in the first driving period DP1 may be supplied to the light emitting element LD, and the light emitting element LD may emit light based on the driving current.

In an embodiment, in the second driving period DP2, the fifth scan signal GB2*i* may not be supplied. For example, as shown in FIG. 5A, the fifth scan signal GB2*i* of the high level H (e.g., the gate-off level) may be supplied to the fifth scan line S5*i* in the second driving period DP2. Accordingly, in the second driving period DP2, the eighth transistor M8 may maintain a turn-off state.

However, this is merely provided as an example, and the present disclosure is not limited thereto. For example, referring to FIG. 5B, the second non-emission period NEP2 may further include the sixth period P6.

In the sixth period P6, the fifth scan signal GB2*i*' of the low level L (e.g., the gate-on level) may be supplied to the fifth scan line S5*i*. Accordingly, the pre-charging voltage Vpre may be supplied to the first electrode (e.g., the fourth node N4) of the light emitting element LD by the eighth transistor M8 turned on by the supply of the fifth scan signal GB2*i*' in the sixth period P6. Accordingly, the light emitting element LD (e.g., the parasitic capacitor Cpar of the light emitting element LD) may be pre-charged in the sixth period P6 immediately before the second emission period EP2. Here, an operation of the pixel PX in the sixth period P6 may be the same or substantially the same as (or similar to) the operation of the pixel PX in the fourth period P4 described above with reference to FIG. 4, and thus, redundant description thereof may not be repeated.

Figure 6A:
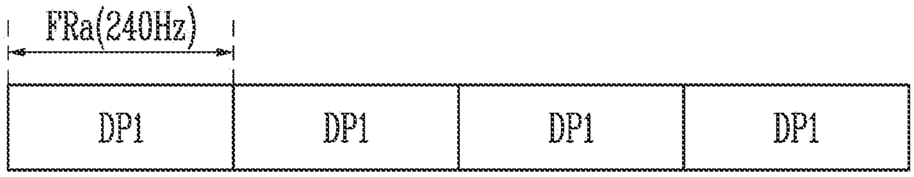
FIGS. 6A-6C are diagrams illustrating an example of driving the display device of FIG. 1 according to a frame frequency.
Figure 6B:
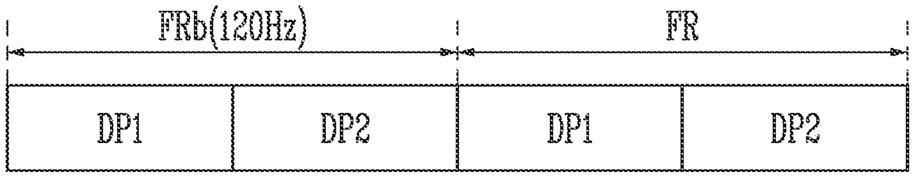
Figure 6C:
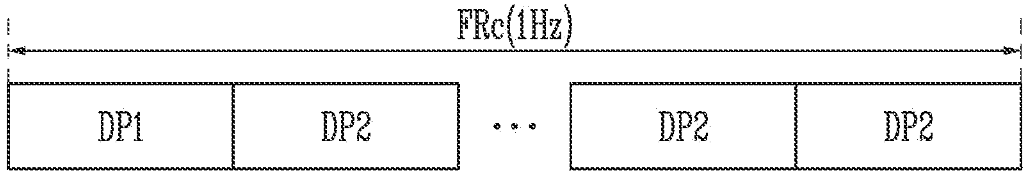

FIGS. 6A to 6C are diagrams illustrating an example of driving the display device of FIG. 1 according to the frame frequency.

Referring to FIGS. 1, 4, 5A, 5B, and 6A to 6C, the display device 1000 may be driven at various frame frequencies.

A frequency of the first driving period DP1 may correspond to the frame frequency.

In an embodiment, as shown in FIG. 6A, a first frame FRa may include the first driving period DP1. For example, when the frequency of the first driving period DP1 is 240 Hz, the first frame FRa may be driven at 240 Hz. For example, a length of the first driving period DP1 and the first frame FRa may be about 4.17 ms.

In an embodiment, as shown in FIG. 6B, a second frame FRb may include the first driving period DP1 and one second driving period DP2. For example, the first driving period DP1 and the second driving period DP2 may be repeated. In this case, the second frame FRb may be driven at 120 Hz. For example, a length of each of the first driving period DP1 and the one second driving period DP2 may be about 4.17 ms, and a length of the second frame FRb may be about 8.33 ms.

In an embodiment, as shown in FIG. 6C, a third frame FRc may include one first driving period DP1 and a plurality of repeated second driving periods DP2. For example, when the third frame FRc is driven at 1 Hz, a length of the third frame FRc may be about 1 second, and the second driving period DP2 may be repeated about 239 times within the third frame FRc.

As described above, by controlling the number of repetitions of the second driving period DP2 within one frame, the display device 1000 may be freely driven at various frame frequencies (for example, 1 Hz to 480 Hz).

Figure 7A:
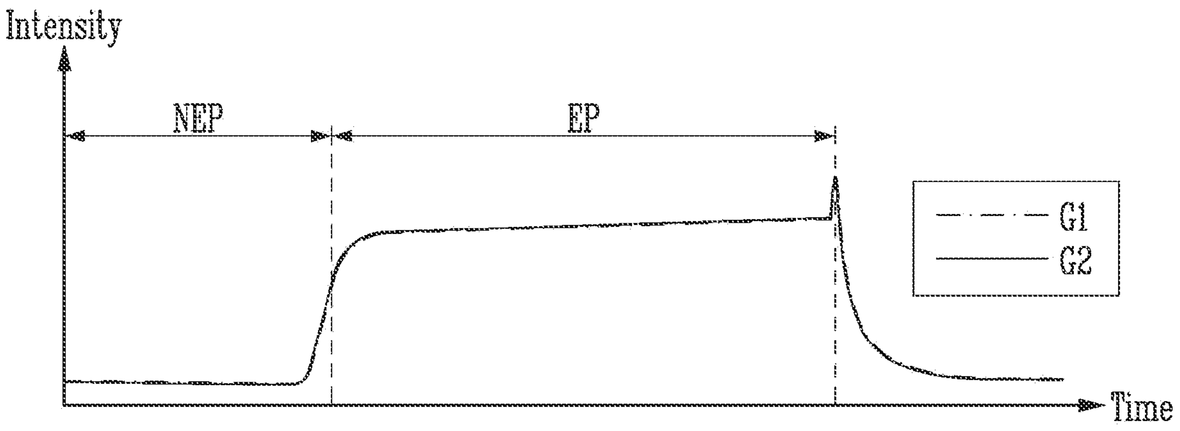
FIG. 7A is a graph illustrating a luminance change of light emitted from a light emitting element included in the pixel of FIG. 3.
Figure 7B:
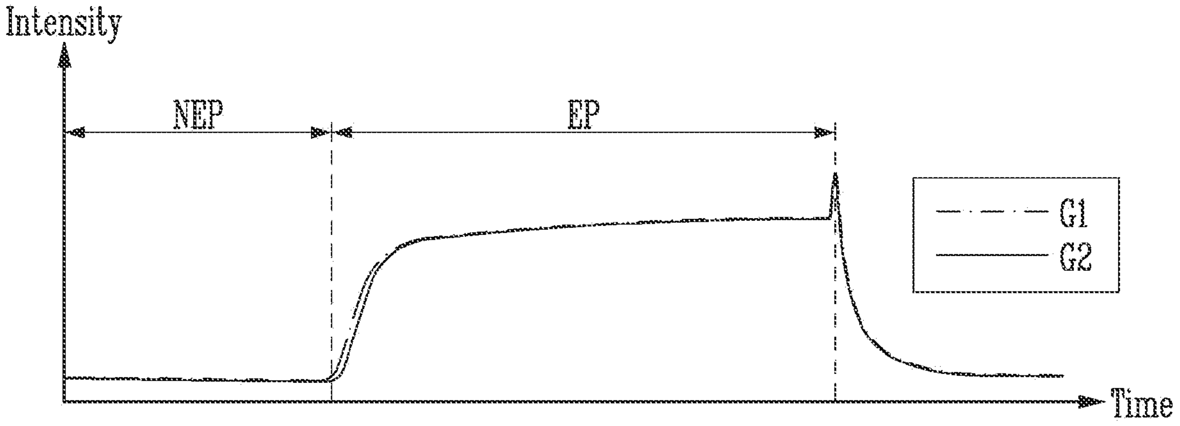
FIG. 7B is a graph illustrating a luminance change of light emitted from a light emitting element included in a pixel according to a comparative example.

FIG. 7A is a graph illustrating a luminance change of the light emitted from the light emitting element included in the pixel of FIG. 3. FIG. 7B is a graph illustrating a luminance change of light emitted from a light emitting element included in a pixel according to a comparative example.

FIG. 7A shows graphs G1 and G2 for an intensity of a luminance according to a time when the light emitting element LD is pre-charged in the non-emission period NEP (for example, the first non-emission period NEP1 and the second non-emission period NEP2) immediately before the emission period EP (for example, the first emission period EP1 and the second emission period EP2) as described above with reference to FIGS. 3 to 5B, and FIG. 7B shows the graphs G1 and G2 of the intensity of the luminance according to the time when the light emitting element LD is not pre-charged.

The first graph G1 shown in each of FIGS. 7A and 7B indicates a graph of the intensity of the luminance after the display device (e.g., the display device 1000 of FIG. 1) is driven for a long time, and the second graph G2 shown in each of FIG. 7B and FIG. 7B indicates a graph of the intensity of the luminance during initial driving of the display device (e.g., the display device 1000 of FIG. 1).

Referring to FIG. 7A, as described above with reference to FIGS. 1 and 3 to 5B, in the non-emission period NEP, the light emitting element LD (e.g., the parasitic capacitor Cpar of the light emitting element LD) included in the pixel PX may be pre-charged. In this case, the luminance after the display device 1000 is driven for a long time may be the same or substantially the same as the luminance during the initial driving of the display device 1000. For example, as shown in FIG. 7A, the first graph G1 and the second graph G2 indicating the change of the luminance in the non-emission period NEP and the emission period EP may indicate the same or substantially the same shape.

On the other hand, referring to the comparative example of FIG. 7B, when the light emitting element is not pre-charged in the non-emission period NEP, the luminance after the display device is driven for a long time may be different from the luminance during the initial driving. For example, as described above with reference to FIGS. 3 to 5B, because the capacitance of the parasitic capacitor of the light emitting element is reduced due to the deterioration of the light emitting element, the parasitic capacitor may be charged even with a relatively small current amount, and thus, the luminance of the light emitted from the light emitting element may be relatively high. For example, as shown in FIG. 7B, the first graph G1 indicating the luminance change after driving for a long time and the second graph G2 indicating the luminance change during the initial driving may indicate different shapes from each other in the emission period EP in which the driving current is supplied to the light emitting element. In other words, when the display device is driven for a long time with respect to the same displayed image, the luminance may be displayed differently according to a capacitance difference of the parasitic capacitor of the light emitting element, and the luminance may be displayed non-uniformly for each pixel according to the deterioration deviation of the light emitting element.

Figure 8:
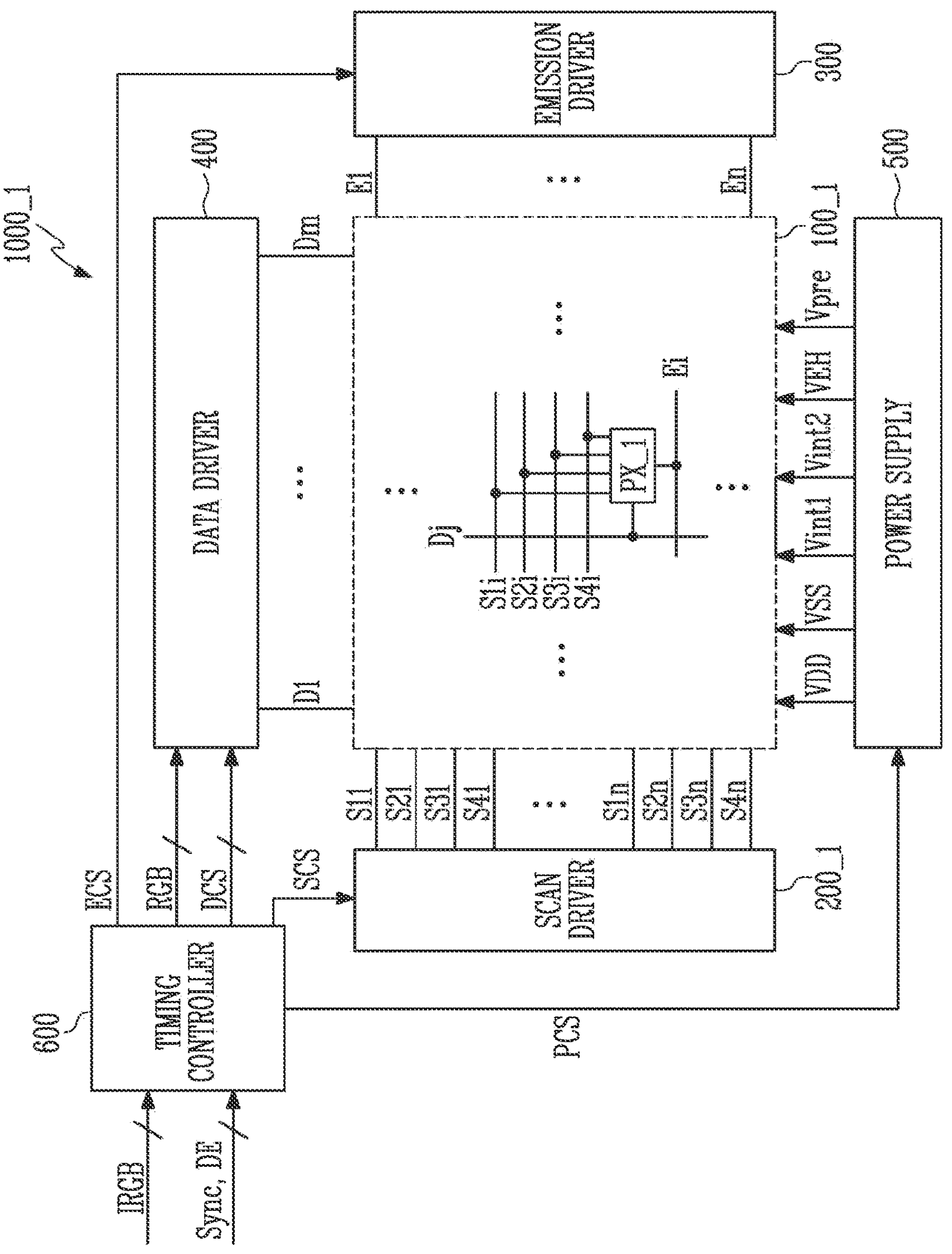
FIG. 8 is a block diagram illustrating a display device according to one or more embodiments of the present disclosure.

FIG. 8 is a block diagram illustrating a display device according to one or more embodiments of the present disclosure. The display device 1000_1 of FIG. 8 is the same or substantially the same as (or similar to) the display device 1000 described above with reference to FIG. 1, except that a scan driver 200_1 does not supply the fifth scan signal (for example, the fifth scan signal supplied to the fifth scan lines S51 to S5*n* by the scan driver 200 described above with reference to FIG. 1), and a pixel PX_1 included in a pixel unit 100_1 (e.g., a display panel) is not connected to a fifth scan line (for example, the fifth scan line S5*i* described above with reference to FIG. 1). Accordingly, in FIG. 8, the same reference numerals are used for the same or substantially the same components as those described above, and redundant description thereof may not be repeated.

Referring to FIG. 8, the display device 1000_1 may include the pixel unit 100_1, the scan driver 200_1, the emission driver 300, the data driver 400, the power supply 500, and the timing controller 600.

The pixel unit 100_1 may include the scan lines S11 to S1*n*, S21 to S2*n*, S31 to S3*n*, and S41 to S4*n*, the emission control lines E1 to En, and the data lines D1 to Dm (where, m and n are integers greater than 1). The pixel unit 100_1 may include pixels PX_1 connected to the scan lines S11 to S1*n*, S21 to S2*n*, S31 to S3*n*, and S41 to S4*n*, the emission control lines E1 to En, and the data lines D1 to Dm.

Figure 9:
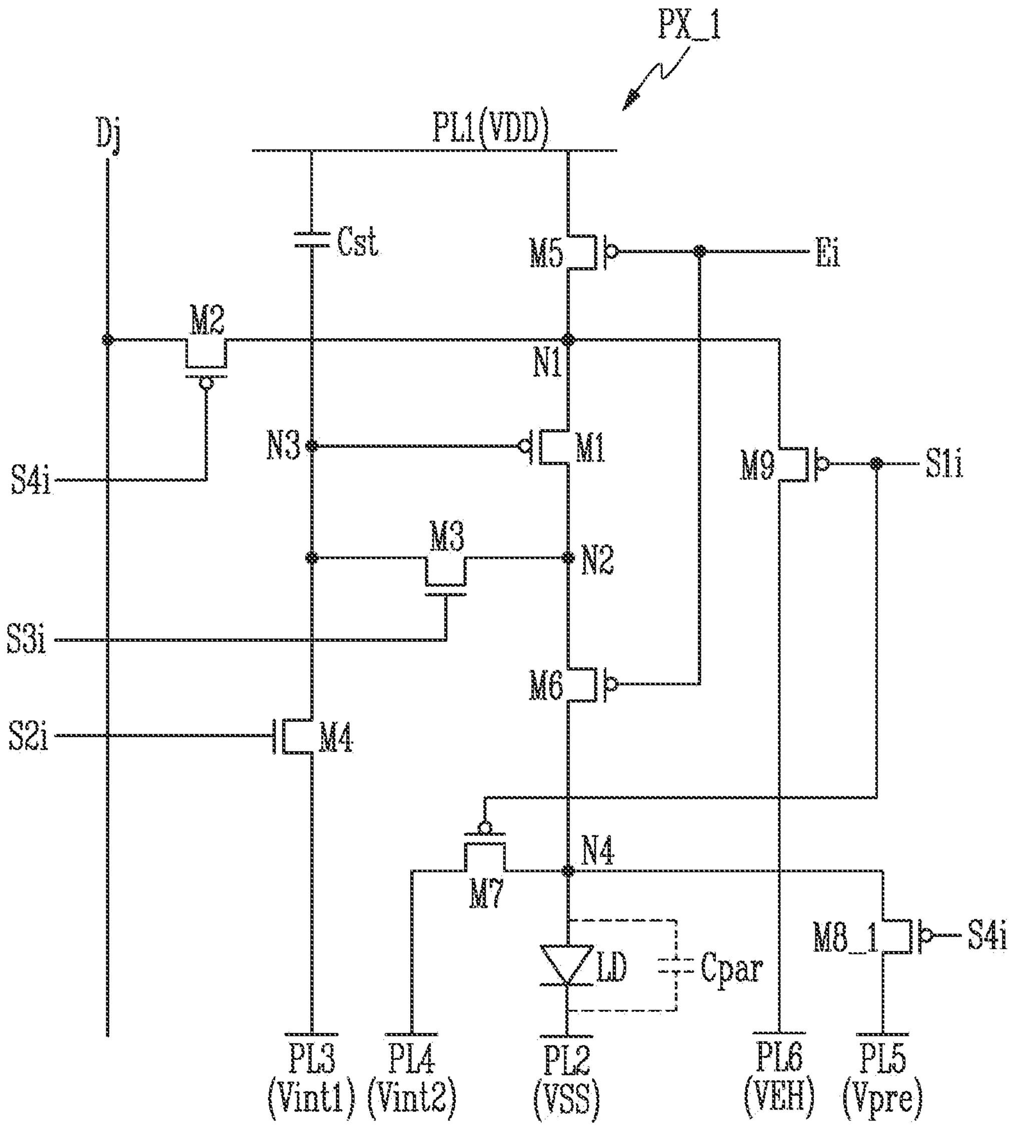
FIG. 9 is a circuit diagram illustrating an example of a pixel included in the display device of FIG. 8.

FIG. 9 is a circuit diagram illustrating an example of the pixel included in the display device of FIG. 8. The pixel PX_1 of FIG. 9 is the same or substantially the same as (or similar to) the pixel PX described above with reference to FIG. 3, except that a gate electrode of the eighth transistor M8_1 is connected to the fourth scan line S4*i*. Accordingly, in FIG. 9 the same reference numerals are used for the same or substantially the same components as those described above, and redundant description thereof may not be repeated.

In FIG. 9, the pixel PX_1 positioned at (e.g., in or on) the i-th horizontal line (e.g., the i-th pixel row) and connected to the j-th data line Dj is shown for convenience of illustration (where, i and j are natural numbers). The pixel PX_1 (e.g., each of the pixels PX_1) shown in FIG. 8 may have the same or substantially the same structure as that of the pixel PX_1 shown in FIG. 9, and thus, redundant description thereof may not be repeated.

Referring to FIGS. 8 and 9, the pixel PX_1 may include the light emitting element LD, first to ninth transistors M1 to M7, M8_1, and M9, and the first capacitor Cst (e.g., the storage capacitor).

The eighth transistor M8_1 may be connected between the first electrode (e.g., the fourth node N4) of the light emitting element LD and the fifth power line PL5 for providing the pre-charging voltage Vpre. A gate electrode of the eighth transistor M8_1 may be connected to the fourth scan line S4*i*. The eighth transistor M8_1 may be turned on when the fourth scan signal is supplied to the fourth scan line S4*i*, to supply the pre-charging voltage Vpre to the fourth node N4 (e.g., the first electrode of the light emitting element LD).

As described above with reference to FIGS. 8 and 9, in a case of the pixel PX_1 of FIG. 9, because a separate scan line (for example, the fifth scan line S5*i* described above with reference to FIG. 3) for controlling the eighth transistor M8_1 that supplies the pre-charging voltage Vpre to the first electrode (e.g., the fourth node N4) of the light emitting element LD is omitted, a circuit configuration of the pixel PX_1 and a configuration of the pixel unit 100_1 included in the display device 1000_1 may be further simplified, and a configuration and an operation of the scan driver 200_1 included in the display device 1000_1 may be further simplified.

The pixel, and the display device including the pixel, according to embodiments of the present disclosure, may pre-charge a light emitting element in a non-emission period immediately before an emission period. Accordingly, a luminance non-uniformity phenomenon according to a deterioration variation of the light emitting elements may be improved (e.g., removed).

However, the aspects and features of the present disclosure are not limited to those described above, and may be variously expanded within a range, without departing from the spirit and scope of the present disclosure.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A pixel comprising:
- a light emitting element;
- a first transistor connected between a first node and a second node, and configured to generate a driving current to flow from a first power line to a second power line through the light emitting element, the first power line being configured to provide a first power voltage, and the second power line being configured to provide a second power voltage;
- a second transistor connected between a data line and the first node, and configured to be turned on in response to a fourth scan signal supplied to a fourth scan line;
- a third transistor connected between the second node and a third node corresponding to a gate electrode of the first transistor, and configured to be turned on in response to a third scan signal supplied to a third scan line;
- a fourth transistor connected between the third node and a third power line, and configured to be turned on in response to a second scan signal supplied to a second scan line, the third power line being configured to provide a third power voltage;
- a fifth transistor connected between the first power line and the first node, and configured to be turned off in response to an emission control signal supplied to an emission control line;
- a sixth transistor connected between the second node and a fourth node corresponding to a first electrode of the light emitting element, and configured to be turned off in response to the emission control signal;
- a seventh transistor directly connected between the fourth node and a fourth power line, and configured to be turned on in response to a first scan signal supplied to a first scan line, the fourth power line being configured to provide a fourth power voltage; and
- an eighth transistor directly connected between the fourth node and a fifth power line, and configured to be turned on in response to a fifth scan signal supplied to a fifth scan line, the fifth power line being configured to provide a fifth power voltage
- wherein the fifth power voltage is greater than the fourth power voltage, and
- wherein the fourth scan line and the fifth scan line are the same scan line.

2. The pixel according to claim 1, wherein a voltage level of the fifth power voltage is less than a value obtained by adding a threshold voltage of the light emitting element with the second power voltage.

3. The pixel according to claim 1, further comprising:
- a ninth transistor connected between the first node and a sixth power line, and configured to be turned on in response to the first scan signal, the sixth power line being configured to provide a sixth power voltage.

4. The pixel according to claim 3, wherein one frame period comprises:
- a first driving period in which the fourth scan signal is supplied to the second transistor, a data signal supplied to the data line is written, and the first scan signal is supplied to the ninth transistor; and
- a second driving period in which the fourth scan signal is not supplied to the second transistor, and the first scan signal is supplied to the ninth transistor.

5. The pixel according to claim 4, wherein the first driving period comprises:
- a first period in which the third scan signal is supplied to the third transistor, and the first scan signal is supplied to the seventh transistor and the ninth transistor;
- a second period in which the second scan signal is supplied to the fourth transistor after the first period;
- a third period in which the third scan signal is supplied to the third transistor, and the fourth scan signal is supplied to the second transistor after the second period; and
- a fourth period in which the fifth scan signal is supplied to the eighth transistor after the third period.

6. The pixel according to claim 5, wherein a width of the third scan signal is greater than a width of the first scan signal during the first period.

7. The pixel according to claim 5, wherein a width of the third scan signal is greater than a width of the fourth scan signal during the third period.

8. The pixel according to claim 4, wherein the second driving period comprises a fifth period in which the first scan signal is supplied to the seventh transistor and the ninth transistor.

9. The pixel according to claim 8, wherein the second driving period further comprises a sixth period in which the fifth scan signal is supplied to the eighth transistor after the fifth period.

10. A display device comprising:
- a pixel connected to a first scan line, a second scan line, a third scan line, a fourth scan line, a fifth scan line, an emission control line, a data line, a first power line, a second power line, a third power line, a fourth power line, a fifth power line, and a sixth power line;
- a scan driver configured to supply a first scan signal to the first scan line, a second scan signal to the second scan line, a third scan signal to the third scan line, a fourth scan signal to the fourth scan line, and a fifth scan signal to the fifth scan line;
- an emission driver configured to supply an emission control signal to the emission control line;
- a data driver configured to supply a data signal to the data line; and
- a power supply configured to supply a first power voltage to the first power line, a second power voltage to the second power line, a third power voltage to the third power line, a fourth power voltage to the fourth power line, a fifth power voltage to the fifth power line, and a sixth power voltage to the sixth power line,
- wherein the pixel comprises:
  - a light emitting element;
  - a first transistor connected between a first node and a second node, and configured to generate a driving current to flow from the first power line to the second power line through the light emitting element;
  - a second transistor connected between the data line and the first node, and configured to be turned on in response to the fourth scan signal;
  - a third transistor connected between the second node and a third node corresponding to a gate electrode of the first transistor, and configured to be turned on in response to the third scan signal;
  - a fourth transistor connected between the third node and the third power line, and configured to be turned on in response to the second scan signal;
  - a fifth transistor connected between the first power line and the first node, and configured to be turned off in response to the emission control signal;
  - a sixth transistor connected between the second node and a fourth node corresponding to a first electrode of the light emitting element, and configured to be turned off in response to the emission control signal;

a seventh transistor directly connected between the fourth node and the fourth power line, and configured to be turned on in response to the first scan signal; and an eighth transistor directly connected between the fourth node and the fifth power line, and configured to be turned on in response to the fifth scan signal, wherein the fifth power voltage is greater than the fourth power voltage, and wherein the fourth scan line and the fifth scan line are the same scan line.

11. The display device according to claim 10, further comprising:

a ninth transistor connected between the first node and the sixth power line, and configured to be turned on in response to the first scan signal.

12. The display device according to claim 11, wherein:

one frame period comprises a first driving period and a second driving period;

in the first driving period, the scan driver is configured to supply the first scan signal through the first scan line, and the fourth scan signal through the fourth scan line; and in the second driving period, the scan driver is configured to supply the first scan signal through the first scan line, and not supply the fourth scan signal.

13. The display device according to claim 12, wherein the first driving period comprises:

a first period in which the scan driver is configured to supply the first scan signal to the first scan line, and the third scan signal to the third scan line;

a second period in which the scan driver is configured to supply the second scan signal to the second scan line after the first period;

a third period in which the scan driver is configured to supply the third scan signal to the third scan line, and the fourth scan signal to the fourth scan line after the second period; and a fourth period in which the scan driver is configured to supply the fifth scan signal to the fifth scan line after the third period.

14. The display device according to claim 13, wherein a width of the third scan signal is greater than a width of the first scan signal during the first period, and a width of the third scan signal is greater than a width of the fourth scan signal during the third period.

15. The display device according to claim 12, wherein the second driving period comprises a fifth period in which the scan driver is configured to supply the first scan signal to the first scan line.

16. The display device according to claim 15, wherein the second driving period further comprises a sixth period in which the scan driver is configured to supply the fifth scan signal to the fifth scan line after the fifth period.

* * * * *